United States Patent
Kurita et al.

(10) Patent No.: US 9,658,802 B2
(45) Date of Patent: May 23, 2017

(54) STORAGE SYSTEM

(71) Applicant: Kabushiki Kaisha Toshiba, Minato-ku (JP)

(72) Inventors: Takahiro Kurita, Sagamihara (JP); Daisuke Hashimoto, Musashino (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 86 days.

(21) Appl. No.: 14/205,858

(22) Filed: Mar. 12, 2014

(65) Prior Publication Data

US 2015/0089179 A1 Mar. 26, 2015

(30) Foreign Application Priority Data

Sep. 24, 2013 (JP) ................................. 2013-196935

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/067* (2013.01); *G06F 11/108* (2013.01)

(58) Field of Classification Search
CPC .... G06F 3/0659; G06F 3/0604; G06F 3/0638; G06F 3/067; G06F 2003/0697
See application file for complete search history.

(56) References Cited

U.S. PATENT DOCUMENTS

| | | | |
|---|---|---|---|
| 7,007,027 B2 | 2/2006 | Najork et al. | |
| 8,397,011 B2 | 3/2013 | Ashwood | |
| 8,549,092 B2 | 10/2013 | Resnick | |
| 2007/0083723 A1* | 4/2007 | Dey | ............ G06F 11/2033 711/163 |

(Continued)

FOREIGN PATENT DOCUMENTS

| | | |
|---|---|---|
| CN | 1647045 A | 7/2005 |
| CN | 101105972 A | 1/2008 |

(Continued)

OTHER PUBLICATIONS

Office Action issued Jul. 17, 2015 in Taiwanese Patent Application No. 103105909 (with English language translation).

(Continued)

*Primary Examiner* — Eric S Cardwell
(74) *Attorney, Agent, or Firm* — Oblon, McClelland, Maier & Neustadt, L.L.P.

(57) ABSTRACT

According to one embodiment, a storage system includes a plurality of memory nodes that are connected to each other in two or more different directions and a connection unit. The connection unit issues a command in response to a request from the outside. In the storage system, a plurality of logical memory nodes are constructed by allocating, to one logical memory node, memory nodes including at least one first memory node which stores data to be accessed by the command and a second memory node which stores redundant data of the data stored in the first memory node. The command includes a first address which designates one of the plurality of logical memory nodes and a second address which designates a storage position in a memory space allocated to each logical memory node.

6 Claims, 25 Drawing Sheets

(56) References Cited

U.S. PATENT DOCUMENTS

2008/0304407 A1* 12/2008 Umansky .............. H04L 12/437
370/222
2009/0216924 A1   8/2009 Bennett
2013/0042052 A1   2/2013 Colgrove et al.

FOREIGN PATENT DOCUMENTS

| JP | 2008-537265 | 9/2008 |
| JP | 4542769 | 9/2010 |
| JP | 2012-518843 | 8/2012 |
| JP | 2013-55548 | 3/2013 |

OTHER PUBLICATIONS

Office Action issued on Dec. 15, 2015 in Japanese Patent Application No. 2013-196935 with partial English translation.

* cited by examiner

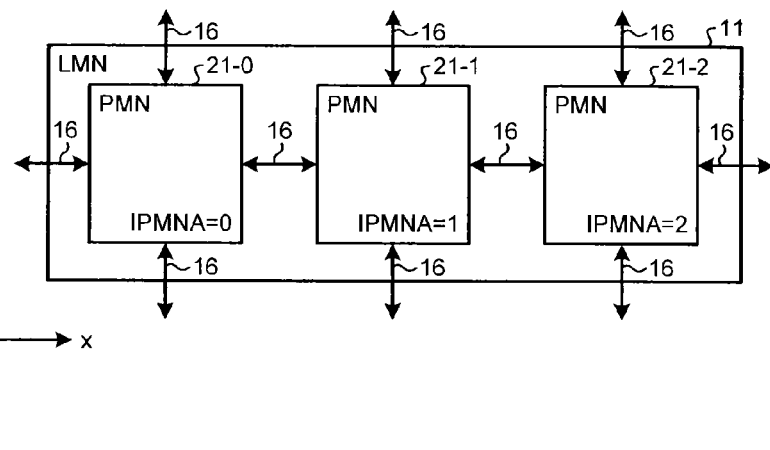
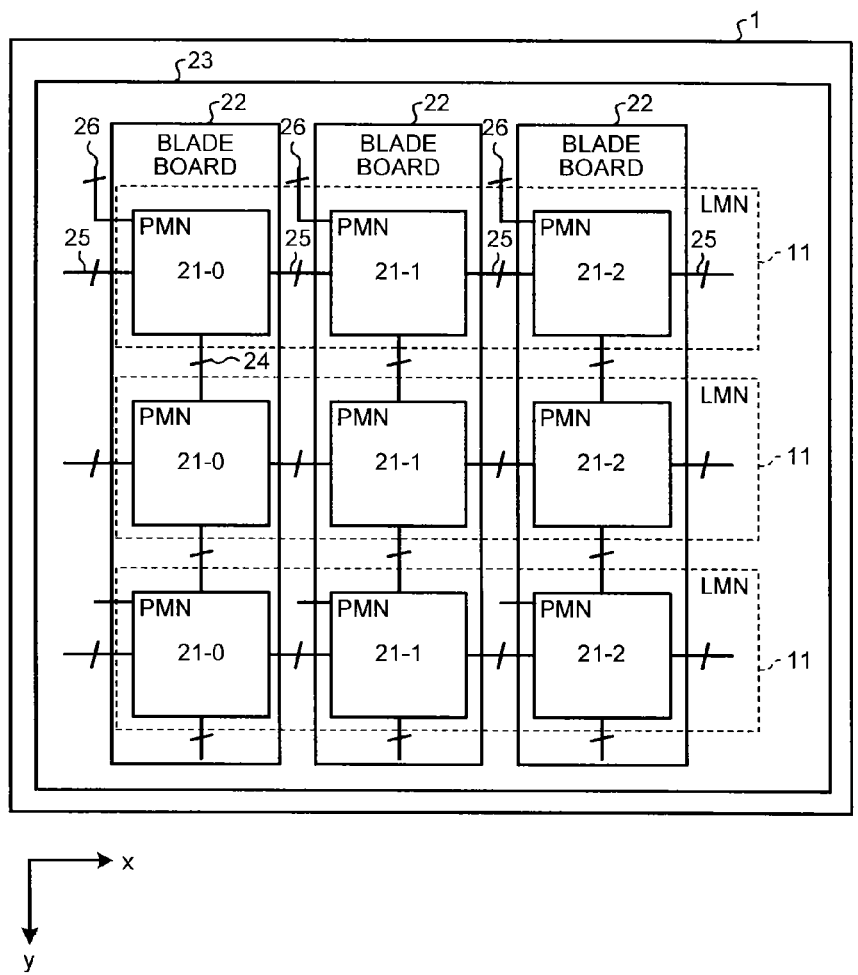

| PMN_LBA | IPMNA=0 | IPMNA=1 | IPMNA=2 |
|---|---|---|---|
| 0 | 0 | 1 | P (0, 1) |
| 1 | 2 | P (2, 3) | 3 |
| 2 | P (4, 5) | 4 | 5 |
| 3 | 6 | 7 | P (6, 7) |
| 4 | 8 | P (8, 9) | 9 |
| ... | ... | ... | ... |

FIG.27
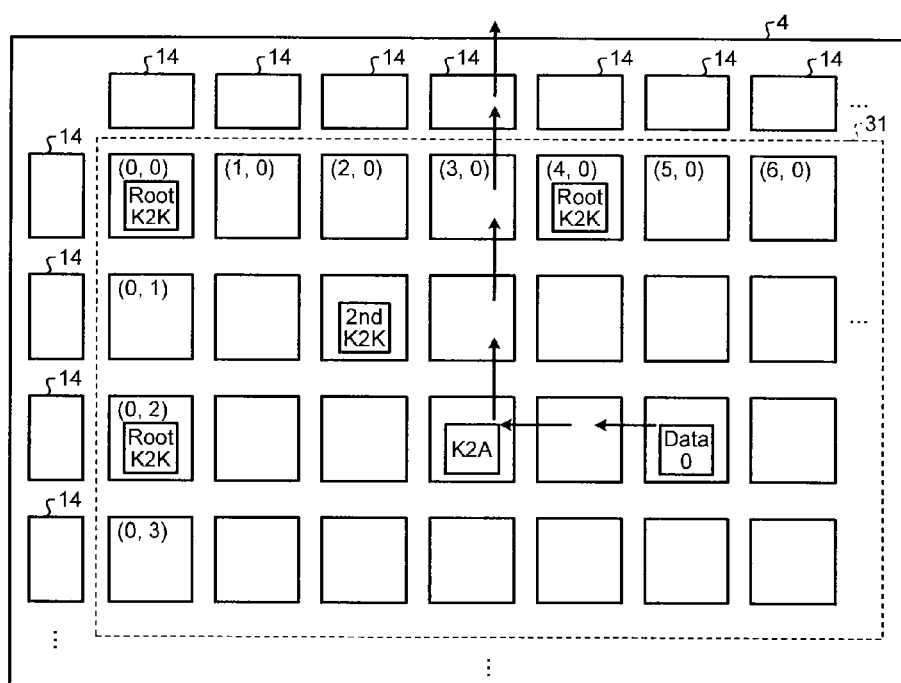
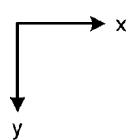

FIG.28
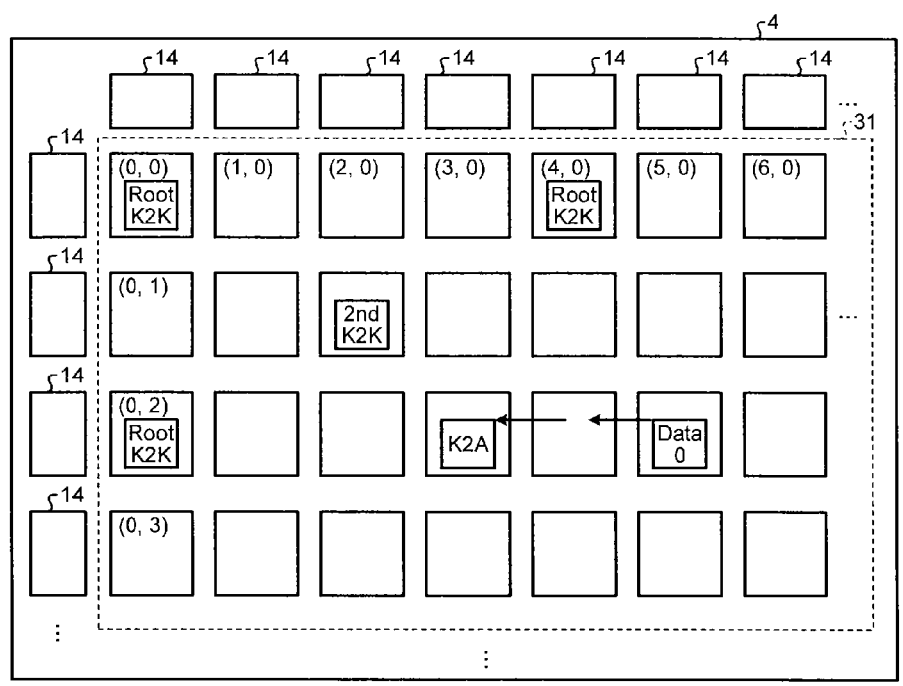
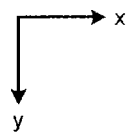

STORAGE SYSTEM

CROSS-REFERENCE TO RELATED APPLICATIONS

This application is based upon and claims the benefit of priority from Japanese Patent Application No. 2013-196935, filed on Sep. 24, 2013; the entire contents of which are incorporated herein by reference.

FIELD

Embodiments described herein relate generally to storage systems.

BACKGROUND

In recent years, the use of a technique in which a plurality of information processing devices including a storage system are connected to each other by a network to form one information processing system (for example, cloud computing) has increased. As the storage system, a storage system has been known in which a plurality of DRAM chips or NAND flash chips are arranged and connected to each other by inter-chip wiring lines to improve the processing speed, as compared to a structure using an HDD according to the related art.

In the single information system formed by connecting a plurality of information processing devices, the performance is improved by increasing the number of information processing devices forming the system. However, a large information processing system with a large number of information processing devices has the problem that external resources required for management increase.

BRIEF DESCRIPTION OF THE DRAWINGS

FIG. 2 is a diagram illustrating an example of the structure of an LMN;
FIG. 3 is a diagram illustrating an example of the physical arrangement of PMNs;
FIG. 27 is a diagram illustrating a transmission path of data when the reading process is performed;
FIG. 28 is a diagram illustrating a transmission path of ACK when a writing process is performed.

DETAILED DESCRIPTION

In general, according to one embodiment, a storage system includes a plurality of memory nodes that are connected to each other in two or more different directions and a connection unit. The connection unit issues a command in response to a request from the outside. In the storage system, a plurality of logical memory nodes are constructed by allocating, to one logical memory node, memory nodes including at least one first memory node which stores data to be accessed by the command and a second memory node which stores redundant data of the data stored in the first memory node. The command includes a first address which designates one of the plurality of logical memory nodes and a second address which designates a storage position in a memory space allocated to each logical memory node. When the first address is not identical to an address of a first logical memory node to which the memory node that has received the command is allocated, the memory node that has received the command transmits the command to another memory node which is adjacent to the memory node that has received the command and is allocated to a logical memory node different from the first logical memory node.

Hereinafter, storage systems according to embodiments will be described in detail with reference to the accompanying drawings. The invention is not limited by these embodiments.

First Embodiment

Figure 1:
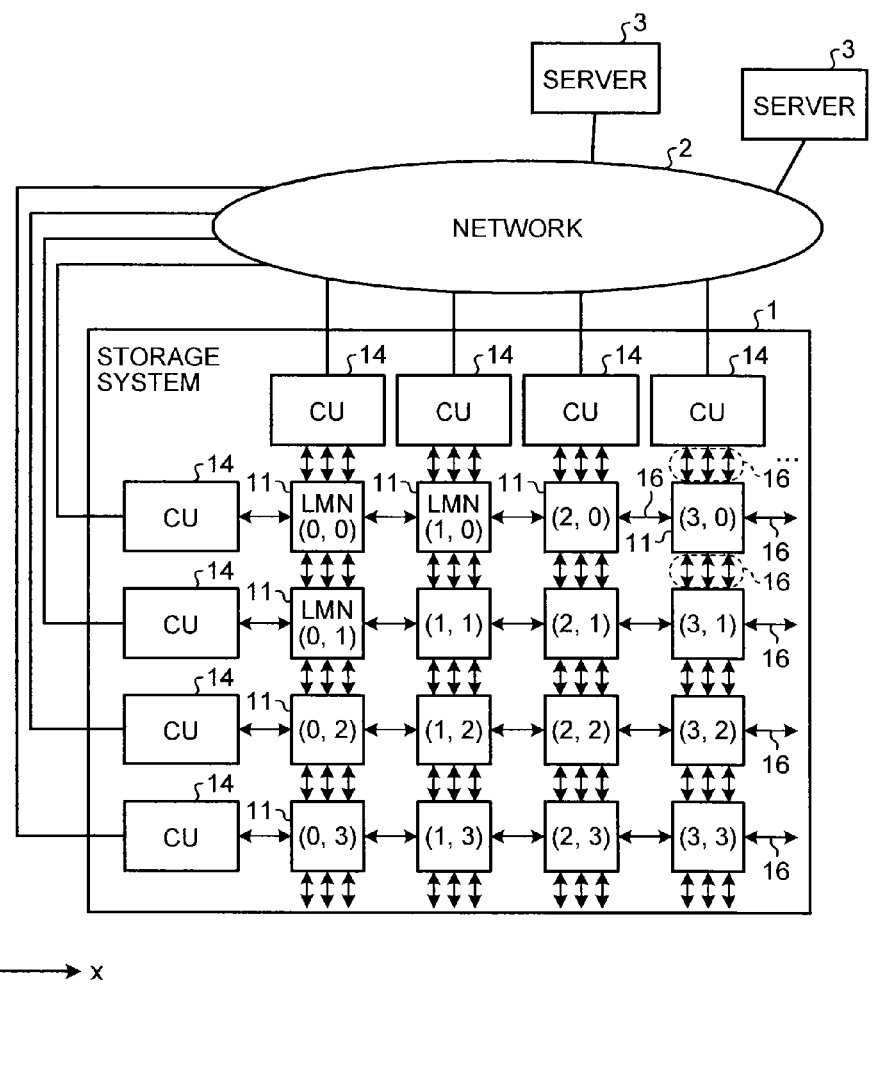
FIG. 1 is a diagram illustrating an example of the structure of a storage system according to a first embodiment.

FIG. 1 is a diagram illustrating an example of the structure of a storage system according to a first embodiment. A storage system 1 is connected to one or more servers 3 via a network 2.

The server 3 is a computer which performs a predetermined process. Typically, the server 3 includes a processor, a main memory, a communication interface, and a local input/output device. The processor loads various kinds of programs (for example, a device driver, an operating system (OS), or an application program) in the main memory. Then, the processor executes various kinds of programs loaded in the main memory to implement the predetermined process. The server 3 can perform a process of writing data to the storage system 1 or reading data from the storage system 1 as an example of the predetermined process. That is, the server 3 functions as a host of the storage system 1. In addition, an arbitrary computer can function as the host of the storage system 1.

An I/O access to the storage system 1 by the server 3 is performed through the network 2. The network 2 is based on any standard. For example, a fiber channel, Ethernet, a storage area network (SAN), or a network attached storage (NAS) can be applied as the network 2. The network 2 includes a network switch, a hub, or a load balancer.

The storage system 1 includes a plurality of logical memory nodes (LMNs) 11 and one or more control units (CUs) 14. The storage system 1 can distribute and store data in a plurality of LMNs 11. In the example illustrated in FIG. 1, each LMN 11 is arranged at a lattice point of a rectangular lattice. Each CU 14 is arranged in the outer periphery of the array of the LMNs 11. The coordinates of the lattice point are represented by coordinates (x, y). The positional information of the LMN 11 arranged at the lattice point corresponds to the coordinates of the lattice point and is represented by a logical memory node address (x, y). In the example illustrated in FIG. 1, the LMN 11 which is disposed at the upper left corner has a logical memory node address (0, 0) of the origin. When each LMN 11 is moved in the horizontal direction (X direction) and the vertical direction (Y direction), the logical memory node address which is represented by an integer value increases and decreases. Hereinafter, the logical memory node address is referred to as an LMNA. Each CU 14 may include the LMNA. For example, of two CUs 14 which are connected to the origin LMN 11, the CU 14 which is connected in the X direction may have an LMNA (−1, 0) and the CU 14 which is connected in the Y direction may have an LMNA (0, −1).

Each LMN 11 includes two or more input/output ports 16. Each LMN 11 is connected to other LMNs 11 which are adjacent in two or more different directions through the input/output ports 16. In FIG. 1, an LMN 11 which is arranged at the upper left corner and is represented by an LMNA (0, 0) is connected to an LMN 11 which is adjacent thereto in the X direction and is represented by an LMNA (1, 0) and an LMN 11 which is adjacent thereto in the Y direction different from the X direction and is represented by an LMNA (0, 1). In FIG. 1, an LMN 11 represented by an LMNA (1, 1) is connected to four LMNs 11 which are adjacent thereto in four different directions and are represented by LMNAs (1, 0), (0, 1), (2, 1) and (1, 2).

In FIG. 1, each LMN 11 is arranged at the lattice point of the rectangular lattice. However, the arrangement aspect of the LMNs 11 is not limited to this example. That is, the lattice may have a shape in which each LMN 11 arranged at the lattice point is connected to other LMNs 11 which are adjacent thereto in two or more different directions. For example, the lattice may have a triangular shape or a hexagonal shape. In FIG. 1, the LMNs 11 are two-dimensionally arranged. However, the LMNs 11 may be three-dimensionally arranged. When the LMNs 11 are three-dimensionally arranged, each LMN 11 can be designated by three values of (x, y, z). When the LMNs 11 are two-dimensionally arranged, the LMNs 11 which are disposed on the opposite sides may be connected to each other in a torus shape.

FIG. 2 is a diagram illustrating an example of the structure of the LMN 11. The LMN 11 includes three physical memory nodes (PMNs) 21-0 to 21-2. The PMN 21-0, the PMN 21-1, and the PMN 21-2 forming the same LMN 11 are identified by addresses IPMNA. In this embodiment, it is assumed that IPMNA=0 is allocated to the PMN 21-0, IPMNA=1 is allocated to the PMN 21-1, and IPMNA=2 is allocated to the PMN 21-2. Hereinafter, in some cases, the PMNs 21-0 to PMN 21-2 are generically referred to as PMNs 21.

The PMN 21-0, the PMN 21-1, and the PMN 21-2 are arranged in the X direction in this order. Two arbitrary PMNs 21 which are adjacent in the X direction are connected to each other through the input/output port 16, regardless of whether they belong to the same LMN 11 or different LMNs 11. Three PMNs 21 belonging to each of the two LMNs 11 which are adjacent in the X direction are connected one-to-one with each other through the input/output ports 16. Specifically, the PMNs 21-0 belonging to two LMNs 11 which are adjacent in the X direction are connected to each other through the input/output port 16. The PMNs 21-1 belonging to two LMNs 11 which are adjacent in the X direction are connected to each other through the input/output port 16. The PMNs 21-2 belonging to two LMNs 11 which are adjacent in the X direction are connected to each other through the input/output port 16. As such, the PMNs 21 are connected to each other in two or more different directions and form one of a plurality of LMNs 11 together with the other PMNs 21.

The arrangement of the LMNs 11 illustrated in FIG. 1 may be logical arrangement and is not necessarily limited to the physical arrangement. In addition, the arrangement of the PMN 21 illustrated in FIG. 2 may be logical arrangement and is not necessarily limited to the physical arrangement. The PMNs 21-0 to 21-2 may not be arranged in the X direction, but may be arranged in the Y direction. In this embodiment, three PMNs 21 which are adjacent in the X direction form one LMN 11. However, three PMNs 21 or a plurality of PMNs 21 except for three PMNs 21 may form one LMN 11.

The LMN 11 can store redundant data. Specifically, the LMN 11 stores data (first data) which is written from the outside in some (first physical memory node) of the PMNs 21-0 to 21-2 and stores second data, which is redundant data of the first data, in a second physical memory node different from the first physical memory node among the PMNs 21-0 to 21-2. In this embodiment, the PMNs 21-0 to 21-2 form RAID 5 as a redundant data storage system. However, the PMNs 21-0 to 21-2 may form a storage system (for example, RAID 0, RAID 2, RAID 6, RAID-Z, or Reed Solomon code) other than RAID 5.

FIG. 3 is a diagram illustrating an example of the physical arrangement of the PMNs 21. The PMNs 21 are mounted on a memory node board (blade board) 22. The blade board 22 is detachably mounted on a board 23. Three PMNs 21 are mounted on one blade board 22 so as to be arranged in the Y direction. Three PMNs 21 belonging to the same LMN 11 belong to a plurality of different blade boards 22. The PMNs 21 are electrically connected to each other through board wiring lines 24, 25, and 26. The board wiring lines 24, 25, and 26 include the input/output ports 16. Two arbitrary adjacent PMNs 21 among the three PMNs 21 mounted on the same blade board 22 are connected to each other through the board wiring line 24 on the blade board 22. Two arbitrary PMNs 21 which belong to different blade boards 22 and are adjacent in the X direction are connected to each other through the board wiring line 25. In addition, a plurality of blade boards 22 are arranged in the Y direction, which are not illustrated in the drawings. Two arbitrary PMNs 21 which belong to different blade boards 22 and are adjacent in the Y direction are connected to each other through the board wiring line 26. The board wiring lines 25 and 26 include detachable connectors. The blade board 22 can be attached to and detached from the board 23 by the connectors.

The PMNs 21 belonging to the same LMN 11 are arranged on different blade boards 22 and form RAID 5. Therefore, even when the blade boards 22 are replaced, data which is stored in the PMN 21 mounted on the old blade board 22 is restored on the basis of data which is stored in another PMN 21 forming RAID 5 and can be stored in the PMN 21 mounted on a new blade board 22. Therefore, when failure occurs in one PMN 21, the blade board 22 having the defective PMN 21 mounted thereon is replaced, which makes it possible to rebuild data, without losing the data stored in the storage system 1. In this embodiment, since RAID 5 is used, it is possible to simultaneously rebuild the failure of one PMN 21 per the same LMN 11. When RAID 6 is used, it is possible to simultaneously rebuild the failure of two PMNs 21 per the same LMN 11.

As illustrated in FIG. 1, each CU 14 is connected to the LMN 11 (specifically, the PMNs 21 forming the LMN 11) through the input/output port 16. In this case, when the communication standard between the LMNs 11 is different from the communication standard between the CU 14 and the LMN 11, an adapter may be provided therebetween. In the example illustrated in FIG. 1, the CUs 14 are connected to one end of each of the X direction and the Y direction of the two-dimensional square lattice in which the LMNs 11 are arranged. The CU 14 which is connected to in the X direction may be connected to three PMNs 21 forming the LMN 11, or it may be connected to one of the three PMNs 21 forming the LMN 11.

The CU 14 generates a command in a packet format which can be transmitted or executed by the PMN 21 in response to a request from the server 3. Then, the CU 14 issues the generated command. Specifically, the CU 14 transmits the generated command to the PMN 21 connected thereto. For example, when receiving an access request (a read request or a write request) from the server 3, the CU 14 generates a command to perform the requested access. The command generated by the CU 14 will be described below. The server 3 may issue a command in the same format as that of the command issued by the CU 14 and the CU 14 may transmit the command issued by the server 3 to the PMN 21 connected thereto.

The PMN 21 which has received the command determines a routing destination PMN 21 among adjacent PMNs 21 on the basis of a predetermined transmission algorithm (which will be described below) and transmits the command to the determined PMN 21. The routing destination means one PMN 21 among a plurality of PMN 21 which are connected to the PMN 21 having received a packet and on a path to a access destination. The access destination means a PMN 21 (or LMN 11) which is a final destination of the packet. In this way, the command reaches the access destination. The PMN 21 can determine the routing destination on the basis of the transmission algorithm such that the command bypasses a defective or congested PMN 21.

Figure 4:
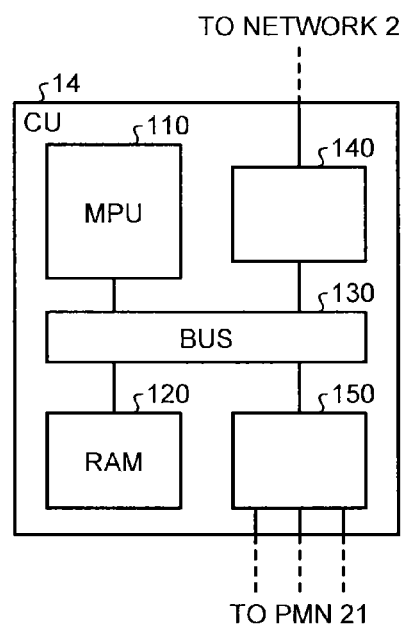
FIG. 4 is a diagram illustrating an example of the structure of a CU.

FIG. 4 is a diagram illustrating an example of the structure of the CU 14. The CU 14 includes a micro processor (MPU) 110, random access memory (RAM) 120 serving as a main memory, a first interface device 140, and a second interface device 150. The first interface device 140 is used to communicate with the network 2. The second interface device 150 is used to communicate with the PMN 21. The MPU 110, the RAM 120, the first interface device 140, and the second interface device 150 are connected to each other by a BUS 130. The CU 14 issues a command in a packet format. The command issued by the CU 14 includes, as information indicating an access destination, at least an LMNA for designating one of the LMNs 11 and an LMN_LBA that is allocated to each LMN 11 and designates a position which can be specified from the outside in a memory space.

For example, the CU 14 may store a table which manages the coordinates of the PMNs 21 for each LMN 11 and dynamically change the PMNs 21 forming the LMN 11. When there is a PMN 21 which is physically defective and is not accessible, the CU 14 changes the allocation of the LMN 11 using the defective PMN 21 and empty PMNs 21 in the storage system 1. In this way, it is possible to continuously operate the storage system 1, without replacing the blade board 22.

Figure 5:
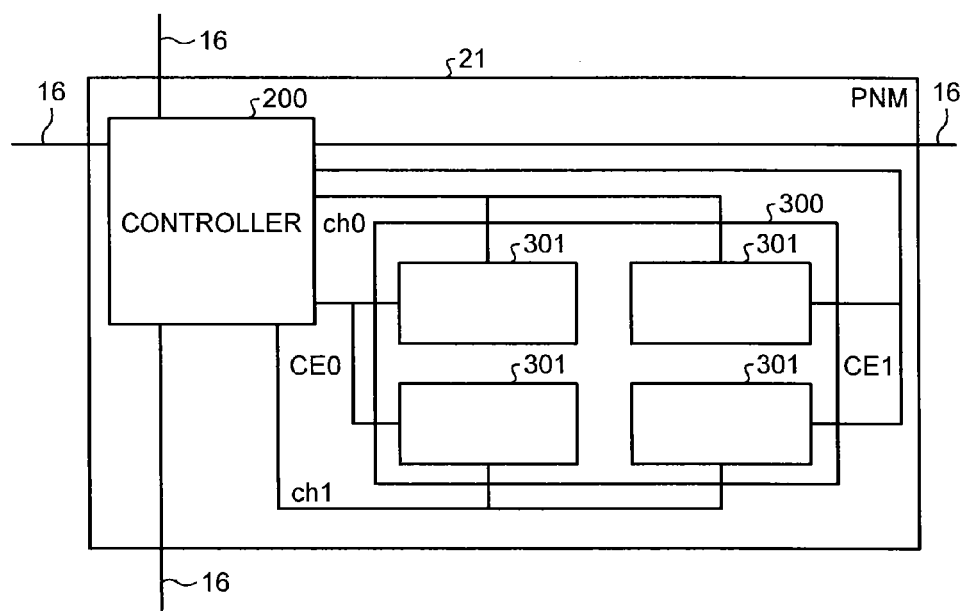
FIG. 5 is a diagram illustrating an example of the structure of the PMN.

FIG. 5 is a diagram illustrating an example of the structure of the PMN 21. The PMN 21 includes a controller 200 and NAND memory 300 serving as a storage memory. In addition to the NAND memory 300, for example, bit-cost scalable memory (BiCS), magnetoresistive memory (MRAM), phase-change memory (PcRAM), or resistive random access memory (ReRAM (registered trademark)) can be applied as the storage memory.

The NAND memory 300 includes four NAND memory chips (dies) 301. Each NAND memory chip 301 includes a memory cell array which provides a storage area. The controller 200 and the NAND memory chips 301 are electrically connected to each other by one or a plurality of IO channels and one or a plurality of chip enable signals. In this embodiment, the PMN 21 includes two pairs of IO channels (ch0 and ch1) and two pairs of chip enable signals (CE0 and CE1) and the controller 200 can independently select the four NAND memory chips 301. The NAND memory chip 301 may be selected by an address signal such as LUN. The controller 200 can control a plurality of TO channels and a plurality of chip enable signals to access a plurality of NAND memory chips 301 in parallel.

The controller 200 is connected to four input/output ports 16. The controller 200 receives packets from the CU 14 or other PMNs 21 through the input/output ports 16 or transmits packets to the CU 14 or other PMNs 21 through the input/output ports 16. When the access destination of the received packet is the own PMN 21, the controller 200 performs a process corresponding to the packet (the command recorded in the packet). For example, when the command is an access command (a read command or a write command), the controller 200 accesses the NAND memory 300.

Figure 6:
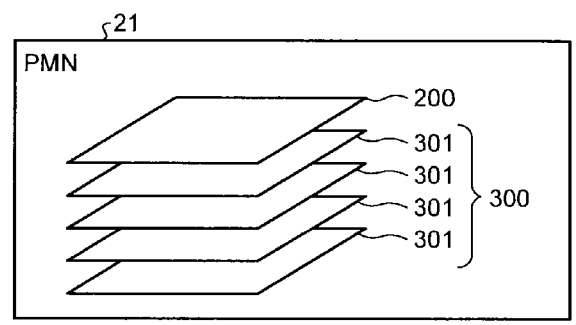
FIG. 6 is a diagram illustrating an example of the package structure of the PMN.

FIG. 6 is a diagram illustrating an example of the package structure of the PMN 21. The controller 200 is formed by one die. The controller 200 and each NAND memory 300 are stacked and are sealed in one package with a resin. That is, each PMN 21 is formed as an independent package.

Figure 7:
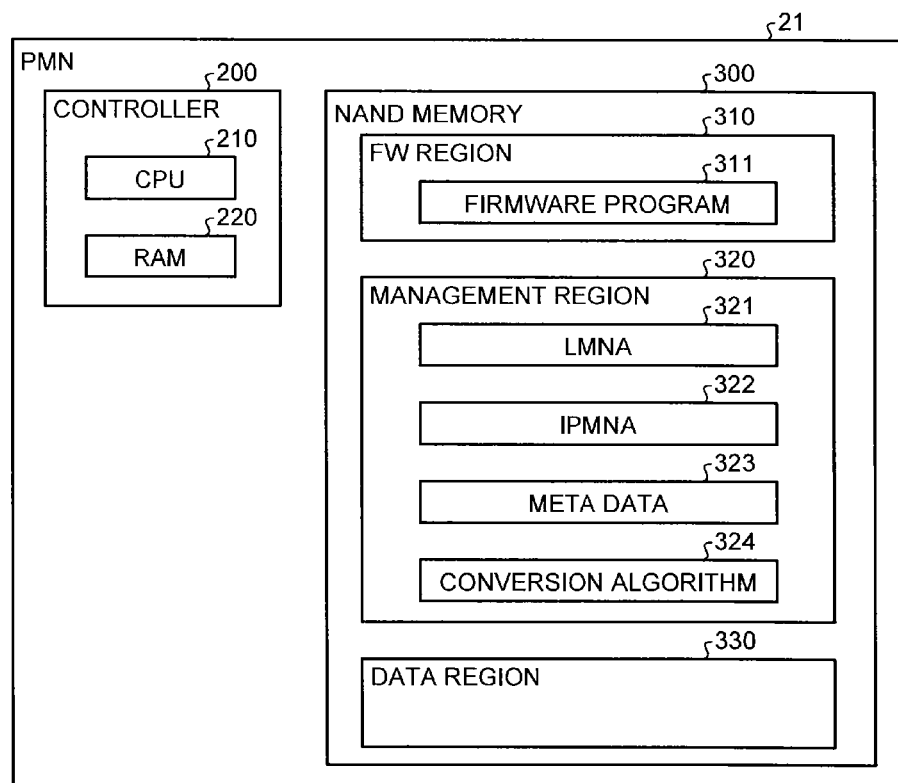
FIG. 7 is a diagram illustrating an example of the structure of the PMN, with attention paid to a memory structure.

FIG. 7 is a diagram illustrating an example of the PMN 21 with attention paid to a memory structure. The controller 200 includes a CPU 210 and random access memory (RAM) 220. The NAND memory 300 includes an FW region 310, a management region 320, and a data region 330. The regions 310 to 330 may be allocated in a storage area of any NAND memory chip 301. The FW region 310 stores a firmware program 311 in advance. The management region 320 stores an LMNA 321 of the LMN 11 including the own PMN 21, an IPMNA 322 allocated to the own PMN 21, meta data 323, and a conversion algorithm 324.

The CPU 210 executes the firmware program 311 to implement the functions of the controller 200. The functions of the controller 200 include, for example, a function of transmitting and receiving packets, a function of executing commands, a function of performing ECC encoding for data to be written to the NAND memory 300, a function of performing ECC encoding for data read from the NAND memory 300, a wear leveling function, and a compaction function. The ECC encoding method is arbitrary. For example, cyclic redundancy check (CRC) encoding, Bose-Chaudhuri-Hocquenghem (BCH) encoding, Reed-Solomon (RS) encoding, or low-density parity-check (LDPC) encoding can be used. In this embodiment, the CPU 210 can achieve error correction using RAID 5.

The RAM 220 is used as a buffer for data which is read from and written to the NAND memory 300, a buffer for packets which are transmitted and received, a loading region of the firmware program 311, or a loading region of various kinds of management information (the LMNA 321, the IPMNA 322, the meta data 323, and the conversion algorithm 324). The RAM 220 may be provided as an external memory of the controller 200 in the PMN 21.

The LMNA is identification information for uniquely specifying each LMN 11 from all LMNs 11. The IPMNA is identification information for uniquely specifying each PMN 21 from all PMNs 21 belonging to the same LMN 11. That is, each PMN 21 provided in the storage system 1 is uniquely specified by a pair of the LMNA and the IPMNA. For example, when the storage system 1 is initialized or when a new blade board 22 is inserted, the LMNA 321 and the IPMNA 322 are stored in the management region 320 by one or more CU 14.

The conversion algorithm 324 is information in which an operation method for converting the LMN_LBA described in the packet into the IPMNA and PMN_LBA is described. The conversion algorithm 324 is common to all PMNs 21 belonging to at least the same LMN 11. The conversion algorithm 324 may be common to all PMNs 21 provided in the storage system 1. The LMN_LBA is information which logically indicates a position in a storage area formed by one LMN 11. The PMN_LBA is information which logically indicates a position in a storage area formed by one PMN 21. The meta data 323 is information in which the correspondence relationship between the PMN_LBA and information (physical address) which physically indicates a position in the NAND memory 300 are recorded. The relationship between the PMN_LBA and the physical address is changed by writing, erasing, and wear leveling. The CPU 210 updates the meta data 323 whenever the relationship between the PMN_LBA and the physical address is changed.

Figures 8, 9:
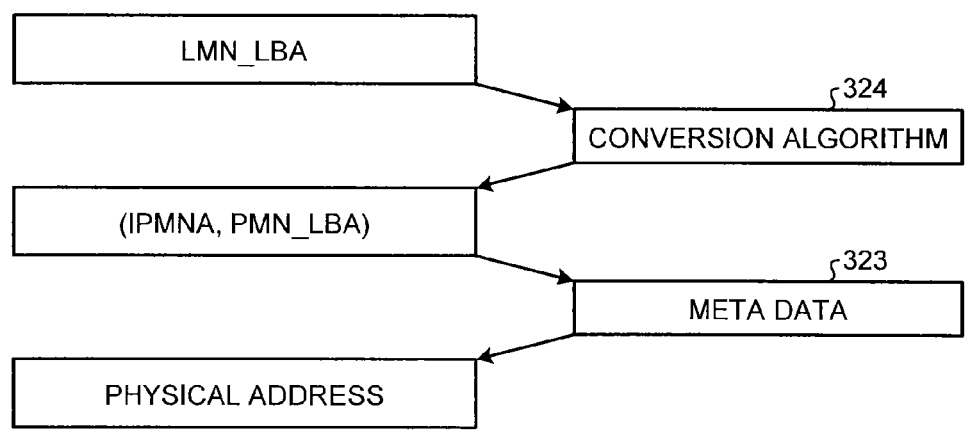
FIG. 8 is a diagram illustrating the forward conversion of a physical address from an LMN_LBA.
FIG. 9 is a diagram illustrating an example of a conversion algorithm.

FIG. 8 is a diagram illustrating the forward conversion of the physical address from the LMN_LBA. The CPU 210 converts the LMN_LBA into the IPMNA and the PMN_LBA according to the conversion algorithm 324. After the IPMNA and the PMN_LBA are calculated, the CPU 210 can convert the PMN_LBA into the physical address with reference to the meta data 323.

FIG. 9 is a diagram illustrating an example of the conversion algorithm 324. In this example, the LMN_LBA is shifted to the right by one bit and the value obtained by the shift is the PMN_LBA. The IPMNA is calculated from the relationship between the value of the LMN_LBA and the value of the PMN_LBA. In the table illustrated in FIG. 9, a column indicates the value of the PMN_LBA, a row indicates the value of the IPMNA, and each mass indicates the value of the LMN_LBA. In addition, P(a, b) is a parity calculated from data which is stored at a position LMN_LBA=a and data which is stored at a position LMN_LBA=b. Hereinafter, a group including LMN_LBA=a (or data stored at the position LMN_LBA=a), LMN_LBA=b (or data stored at the position LMN_LBA=b), and the position (or P(a, b)) where P(a, b) is stored is referred to as a parity group.

For example, in the example illustrated in FIG. 9, LMN_LBA=4 is mapped to the position specified by a pair of IPMNA=1 and PMN_LBA=2. In addition, LMN_LBA=5 is mapped to the position specified by a pair of IPMNA=2 and PMN_LBA=2. A parity which is calculated from data stored at the position LMN_LBA=4 and data stored at the position LMN_LBA=5 is stored at the position specified by a pair of PMN_LBA=2 and IPMNA=0. As such, the PMN 21 can use the conversion algorithm 324 to specify the position designated by the LMN_LBA, other data items which belong to the same parity group as that including data stored at the position, and the position where the parity is stored.

This embodiment is not limited to the above-mentioned example when the conversion algorithm 324 can calculate, from the LMN_LBA, both the storage position of first data, which is written from the outside, in the first physical memory node and the storage position of second data, which is redundant data of the first data, in the second physical memory node.

Next, the operation of the storage system 1 according to the first embodiment will be described.

Figure 10:
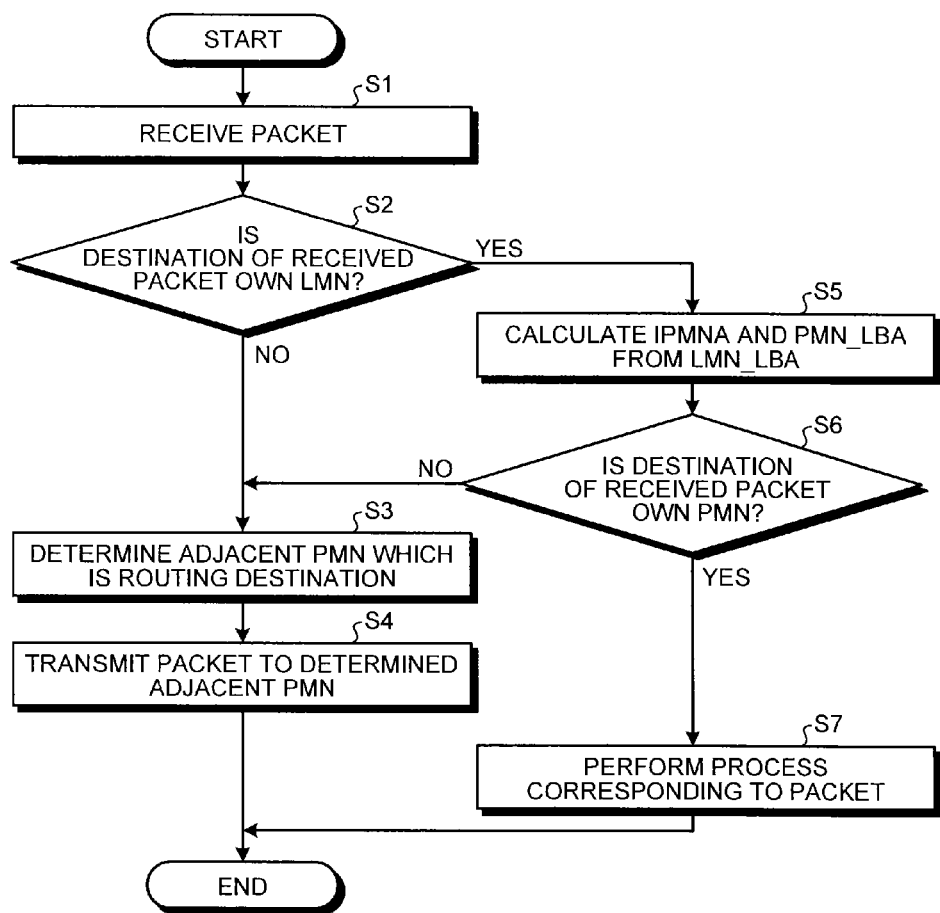
FIG. 10 is a flowchart illustrating the operation of a controller when packets are received from the CU.

FIG. 10 is a flowchart illustrating the operation of the controller 200 when packets are received from the CU 14. The CPU 210 executes the firmware program 311 to implement the operation of the controller 200 illustrated in FIG. 10. In the following description, for simplicity, the controller 200 is an operation subject.

When receiving a packet (S1), the controller 200 determines whether the access destination of the packet is the LMN 11 including the own PMN 21 (S2). Specifically, when the LMNA recorded in the packet is identical to the LMNA 321 stored in the management region 320, the controller 200 can determine that the access destination of the packet is the LMN 11 including the own PMN 21 in S2. When the LMNAs are not identical to each other, the controller 200 can determine that the access destination of the packet is not the LMN 11 including the own PMN 21 in S2.

When the access destination of the packet is not the LMN 11 including the own PMN 21 (S2, No), the controller 200 determines a routing destination PMN 21 among the PMNs 21 adjacent to the own PMN 21 on the basis of a predetermined transmission algorithm (S3). For example, the controller 200 determines the routing destination PMN 21 on the basis of the positional relationship between the access destination (a LMN 11 or a PMN 21) and the LMN 11 including the own PMN 21 or the own PMN 21. For example, the controller 200 determines, as the routing destination PMN 21, a PMN 21 which is disposed on a path from the own PMN 21 to the access destination LMN 11 or the access destination PMN 21 through which the number of times packets are transmitted is at a minimum. When the PMN 21, which is disposed on the path through which the number of times packets are transmitted is at a minimum, among the PMNs 21 adjacent to the own PMN 21 is defective or busy, the controller 200 may determine another PMN 21 as the routing destination. After S3, the controller 200 transmits the packet to the determined routing destination PMN 21 (S4) and ends the operation.

When the access destination of the packet is the LMN 11 including the own PMN 21 (S2, Yes), the controller 200 calculates the IPMNA and the PMN_LBA from the LMN_LBA on the basis of the conversion algorithm 324 (S5). The controller 200 compares the calculated IPMNA with the IPMNA 322 stored in the management region 320 to determine whether the access destination of the packet is the own PMN 21 (S6). When the IPMNAs are identical to each other, the controller 200 can determine that the access destination of the packet is the own PMN 21 (S6, Yes). When the IPMNAs are not identical to each other, the controller 200 can determine that the access destination of the packet is not the own PMN 21 (S6, No).

When the access destination of the packet is not the own PMN 21 (S6, No), the controller 200 performs S3. When the access destination of the packet is the own PMN 21 (S6, Yes), the controller 200 performs a process corresponding to the command recorded in the packet (S7) and ends the operation.

Figure 11:
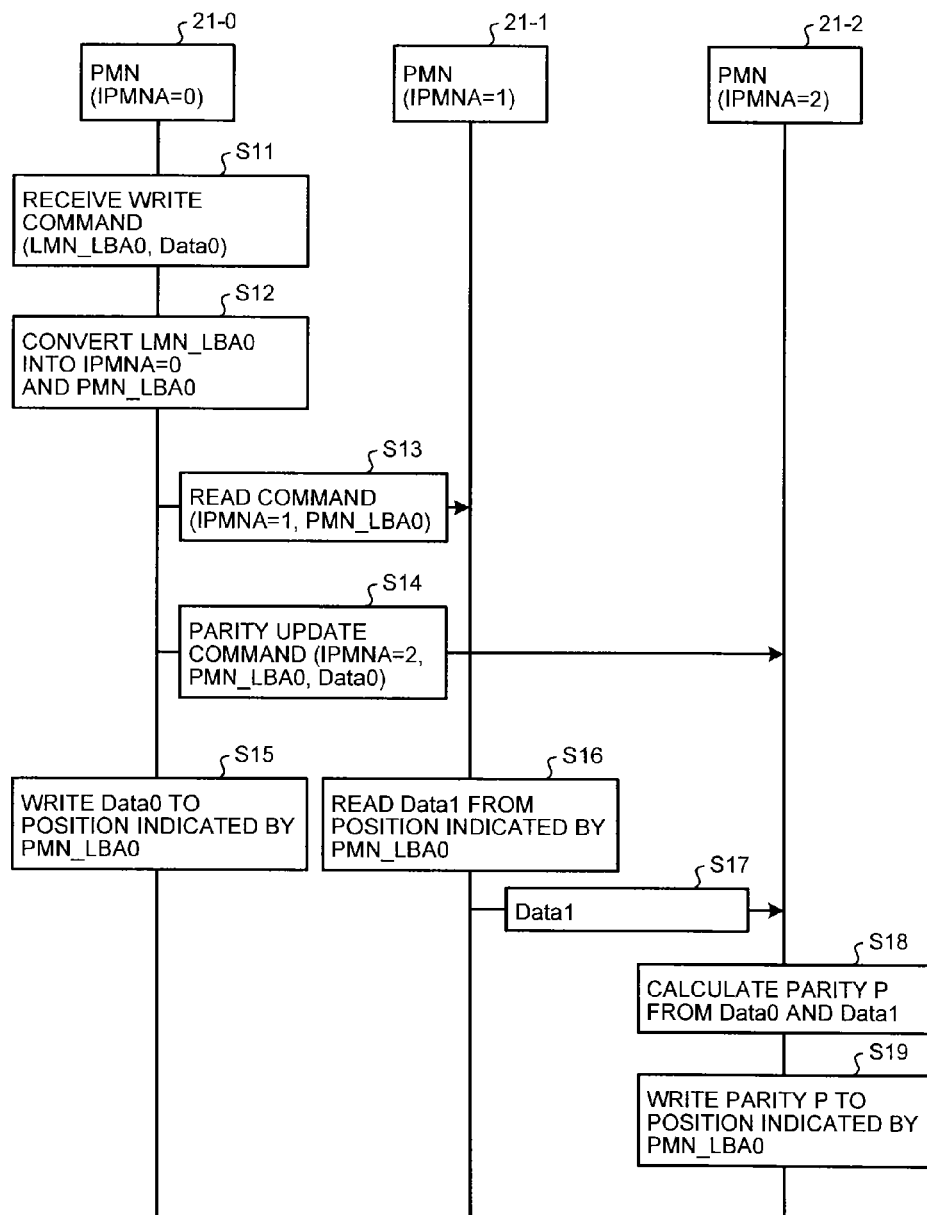
FIG. 11 is a sequence diagram illustrating an example (first writing process) of the processing of a write command from the CU.

FIG. 11 is a sequence diagram illustrating an example (first writing process) of the processing of the write command issued from the CU 14. Each PMN 21 is implemented by the controller 200. In the following description, for simplicity, an operation subject is the PMNs 21-0 to 21-2.

First, the PMN 21-0 receives the write command addressed thereto (S11). The write command received in S11 includes at least an LMNA which specifies the LMN 11 including the PMN 21-0, LMN_LBA0, and Data0. The LMN_LBA0 is converted into IPMNA=0 and PMN_LBA0 by the conversion algorithm 324.

Then, the PMN 21-0 converts LMN_LBA0 into IPMNA=0 and PMN_LBA0 (S12). S12 has been performed in S5, but is added to FIG. 11 for description.

Then, the PMN 21-0 generates a read command to read Data1 which belongs to the same parity group as Data0 and to transmit Data1 to the PMN 21-2 and transmits the generated read command to the PMN 21-1 (S13). The PMN 21-0 generate a parity update command to update the parity and transmits the parity update command to the PMN 21-2 (S14).

The commands generated by the PMN 21 may be different from the commands generated by the CU 14 in a method of expressing an access destination. For example, it is assumed that, in the packet transmitted by the PMN 21, the access destination is expressed by the LMNA, the IPMNA, and the PMN_LBA. In the example illustrated in FIG. 9, the positions forming the same parity group have the same PMN_LBA. Therefore, the read command generated in S13 includes at least IPMNA=1 and PMN_LBA0 as information for designating the access destination. The parity update command generated in S14 includes at least IPMNA=2 and PMN_LBA0 as the information for designating the access destination. When Data0 and Data1 forming the same parity group and the PMN_LBA indicating the storage position of the parity P are different from each other, the PMN 21-0 calculates Data1 and the PMN_LBA indicating the storage position of the parity P from the LMN_LBA on the basis of the conversion algorithm 324 before S13 and S14. The parity update command generated in S14 includes Data0. This is because Data0 is required to calculate the parity P.

The PMN 21-0 writes Data0 to the position indicated by PMN_LBA0 after S13 and S14 (S15).

When receiving the read command from the PMN 21-0, the PMN 21-1 reads Data1 from the position indicated by PMN_LBA0 (S16). Then, the PMN 21-1 transmits Data1 to the PMN 21-2 (S17).

When receiving the parity update command from the PMN 21-0 and Data1 from the PMN 21-1, the PMN 21-2 calculates the parity P from Data0 and Data1 (S18) and writes the parity P to the position indicated by PMN_LBA0 in an overwrite mode (S19).

Figure 12:
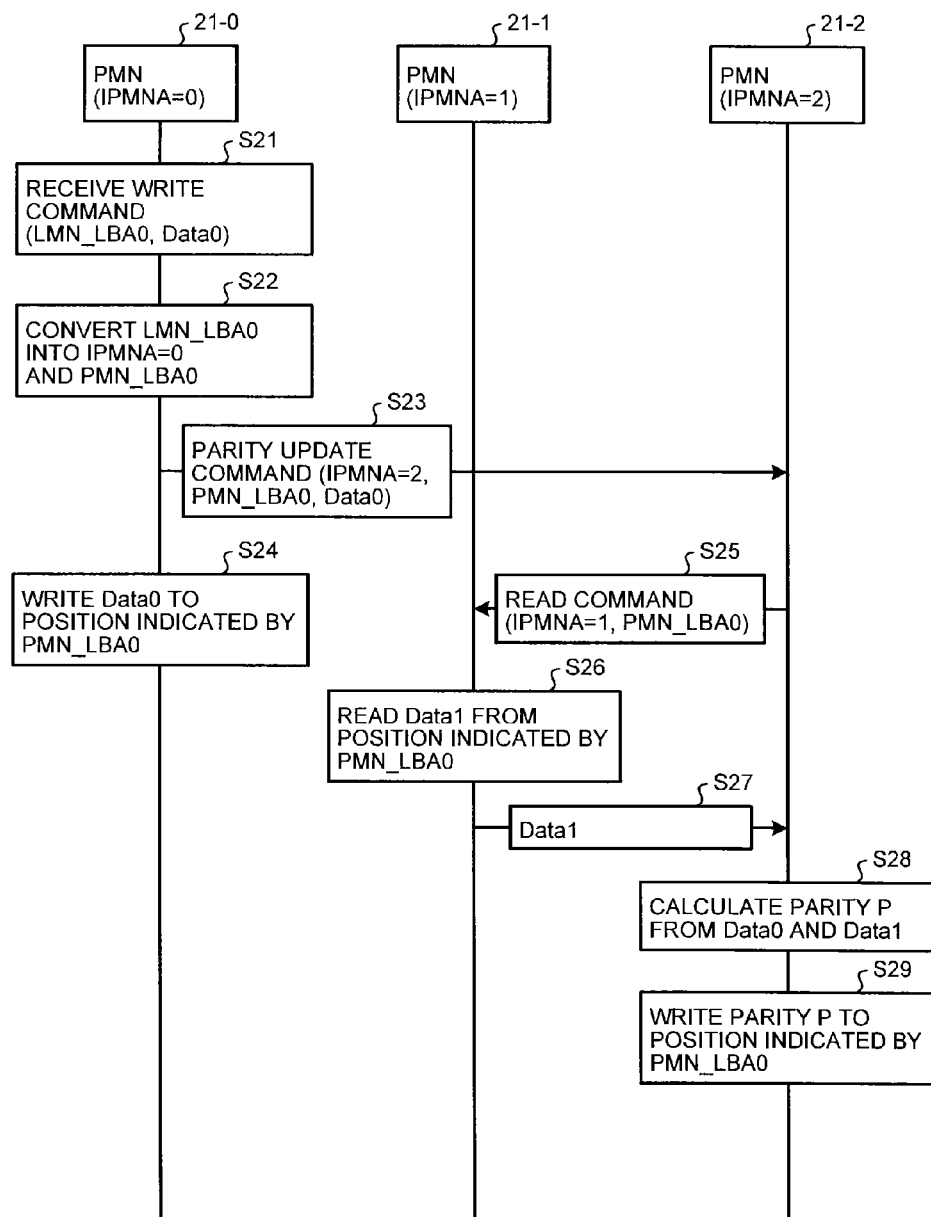
FIG. 12 is a sequence diagram illustrating another example (second writing process) of the processing of the write command from the CU.

FIG. 12 is a sequence diagram illustrating another example (second writing process) of the processing of the write command from the CU 14. S21 and S22 are the same as S11 and S12, respectively. After S22, the PMN 21-0 generates a parity update command and transmits the parity update command to the PMN 21-2 (S23). Then, the PMN 21-0 writes Data0 to the position indicated by PMN_LBA0 (S24).

When receiving the parity update command from the PMN 21-0, the PMN 21-2 generates a read command to read Data1 and to transmit Data1 to the PMN 21-2 and transmits the read command to the PMN 21-1 (S25).

When receiving the read command from the PMN 21-2, the PMN 21-1 reads Data1 from the position indicated by PMN_LBA0 (S26). Then, the PMN 21-1 transmits Data1 to the PMN 21-2 (S27).

When receiving Data1 from the PMN 21-1, the PMN 21-2 calculates the parity P from Data0 and Data1 (S28) and writes the calculated parity P to the position indicated by PMN_LBA0 (S29).

After receiving the parity update command from the PMN 21-0, the PMN 21-2 may wait for the reception of the parity update command from the PMN 21-1 for a predetermined period of time. When receiving the parity update command from the PMN 21-1 in the waiting state, the PMN 21-2 can calculate the parity P, without performing the process of reading Data1 from the PMN 21-1.

Figure 13:
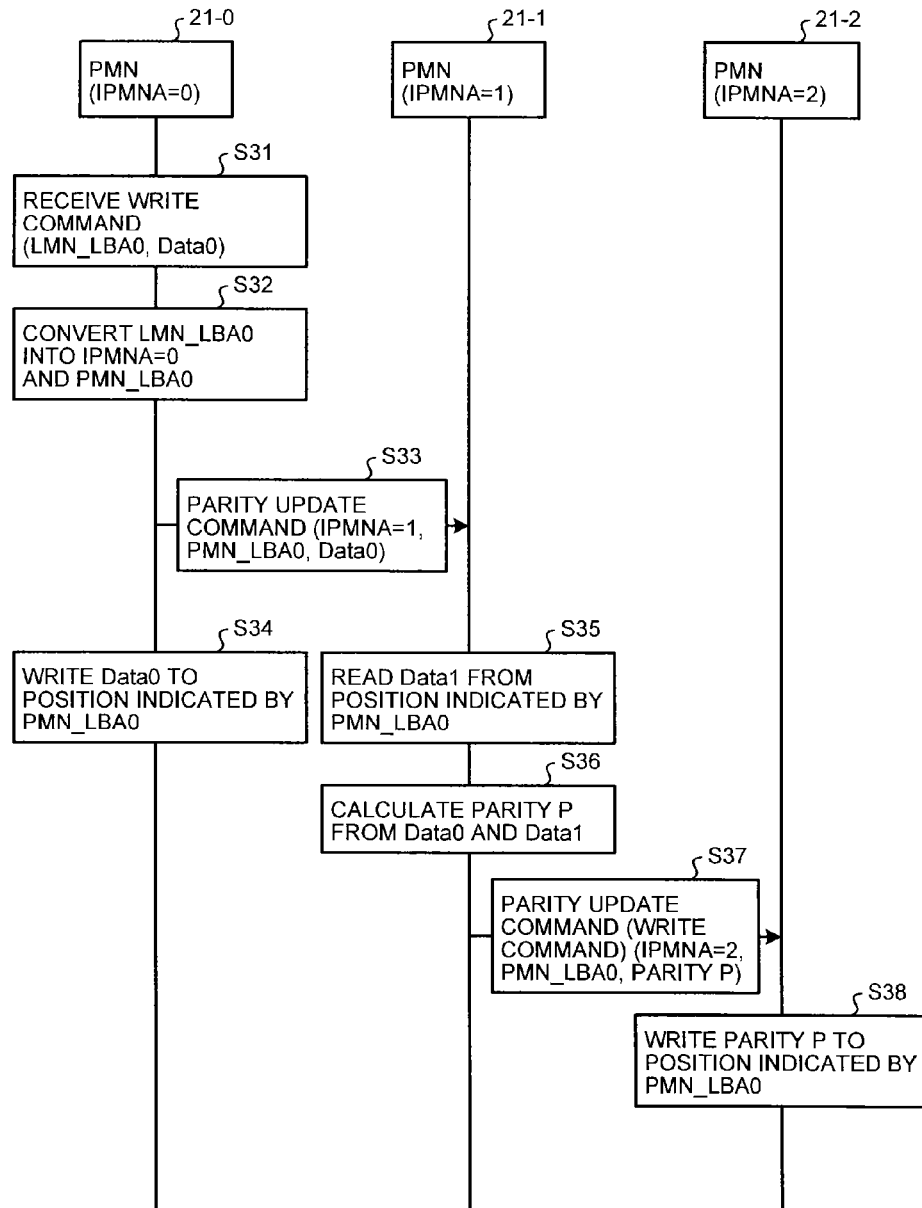
FIG. 13 is a sequence diagram illustrating another example (third writing process) of the processing of the write command from the CU.

FIG. 13 is another example (third writing process) of the processing of the write command from the CU 14. S31 and S32 are the same as S11 and S12, respectively. After S32, the PMN 21-0 generates a parity update command and transmits the parity update command to the PMN 21-1 (S33). IPMNA=1 and PMN_LBA0 serving as information indicating an access destination and Data0 are recorded in the parity update command generated in S33. Then, the PMN 21-0 writes Data0 to the position indicated by PMN_LBA0 (S34).

When receiving the parity update command from the PMN 21-0, the PMN 21-1 reads Data1 from the position indicated by PMN_LBA0 (S35). Then, the PMN 21-1 calculates the parity P from Data0 and Data1 (S36). Then, the PMN 21-1 generates a parity update command and transmits the parity update command to the PMN 21-2 (S37). The parity update command generated in S37 includes IPMNA=2 and PMN_LBA0 which serve as information for designating the access destination and the parity P. That is, the parity update command generated in S37 is the same as a write command to write the parity P to the position indicated by PMN_LBA0.

When receiving the parity update command from the PMN 21-1, the PMN 21-2 writes the parity P to the position indicated by PMN_LBA0 (S38).

After receiving the parity update command from the PMN 21-0, the PMN 21-1 may wait for the reception of the write command from the CU 14 which writes Data1 for a predetermined period of time. When receiving the write command from the CU 14 in the waiting state, the PMN 21-1 can calculate the parity P, without performing the process of reading Data1. The PMN 21-1 may not calculate the parity P and may transmit Data0 and Data1 to the PMN 21-2, and the PMN 21-2 may calculate the parity P.

Figure 14:
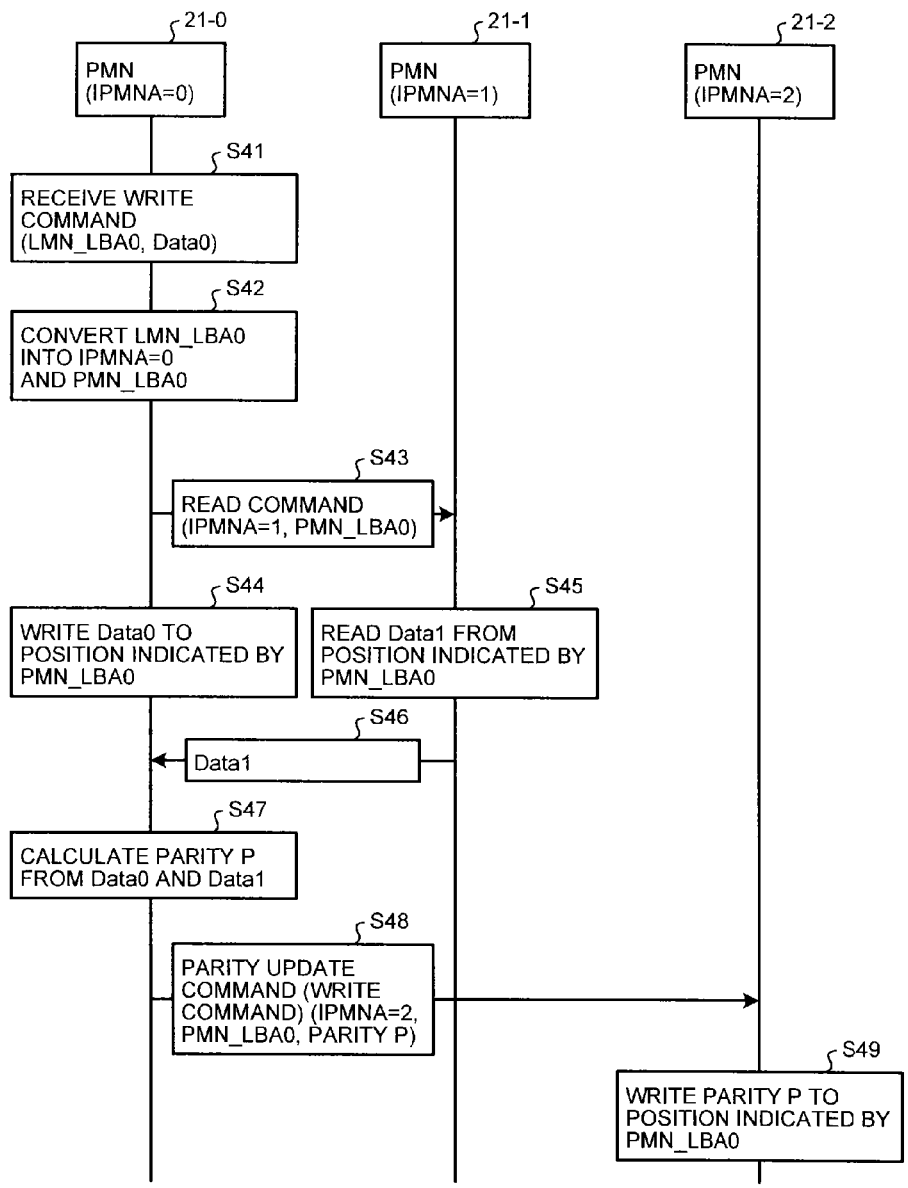
FIG. 14 is a sequence diagram illustrating another example (fourth writing process) of the processing of the write command from the CU.

FIG. 14 is a sequence diagram illustrating another example (fourth writing process) of the processing of the write command from the CU 14. S41 and S42 are the same as S11 and S12, respectively. After S42, the PMN 21-0 generate a read command to read Data1 and to transmit Data1 to the PMN 21-0 and transmits the read command to the PMN 21-1 (S43). Then, the PMN 21-0 writes Data0 to the position indicated by PMN_LBA0 (S44).

When receiving the read command from the PMN 21-0, the PMN 21-1 reads Data1 from the position indicated by PMN_LBA0 (S45). Then, the PMN 21-1 transmits Data1 to the PMN 21-0 (S46).

When receiving Data1 from the PMN 21-1, the PMN 21-0 calculates the parity P from Data0 and Data1 (S47). Then, the PMN 21-0 generates a parity update command and transmits the parity update command to the PMN 21-2 (S48). The parity update command generated in S48 has the same structure as the parity update command generated in S37.

When receiving the parity update command from the PMN 21-0, the PMN 21-2 writes the parity P to the position indicated by PMN_LBA0 in the overwrite mode (S49).

The PMN 21-0 may not calculate the parity P and may transmit Data0 and Data1 to the PMN 21-2, and the PMN 21-2 may calculate the parity P.

As in the first to fourth writing processes, when Data0 has been stored in the position indicated by PMN_LBA0 in each LMN 11, the stored Data0 is updated to Data0 included in the write command and the corresponding parity P is updated with the update of Data0. As in the first to fourth writing processes, an arbitrary PMN 21 among the PMNs 21 in the same LMN 11 can calculate the parity P.

The storage system 1 may receive a TRIM (deletion notice) command from the server 3. Specifically, when the storage system 1 receives the TRIM command, the CU 14 issues the TRIM command. The TRIM command issued by the CU 14 includes at least an LMNA and an LMN_LBA which designates a deletion destination. The PMN 21, which is the destination of the TRIM command, invalidates the correspondence relationship between a PMN_LBA and a physical address converted from the LMN_LBA which is recorded in the meta data 342. When the PMN 21, which is the destination of the TRIM command, invalidates the correspondence relationship between the PMN_LBA and the physical address, information indicating that the correspondence relationship has been invalidated may be transmitted to another PMN 21 forming the same parity group and the correspondence relationship between the PMN_LBA storing the parity P and the physical address storing the parity P may be invalidated.

Figure 15:
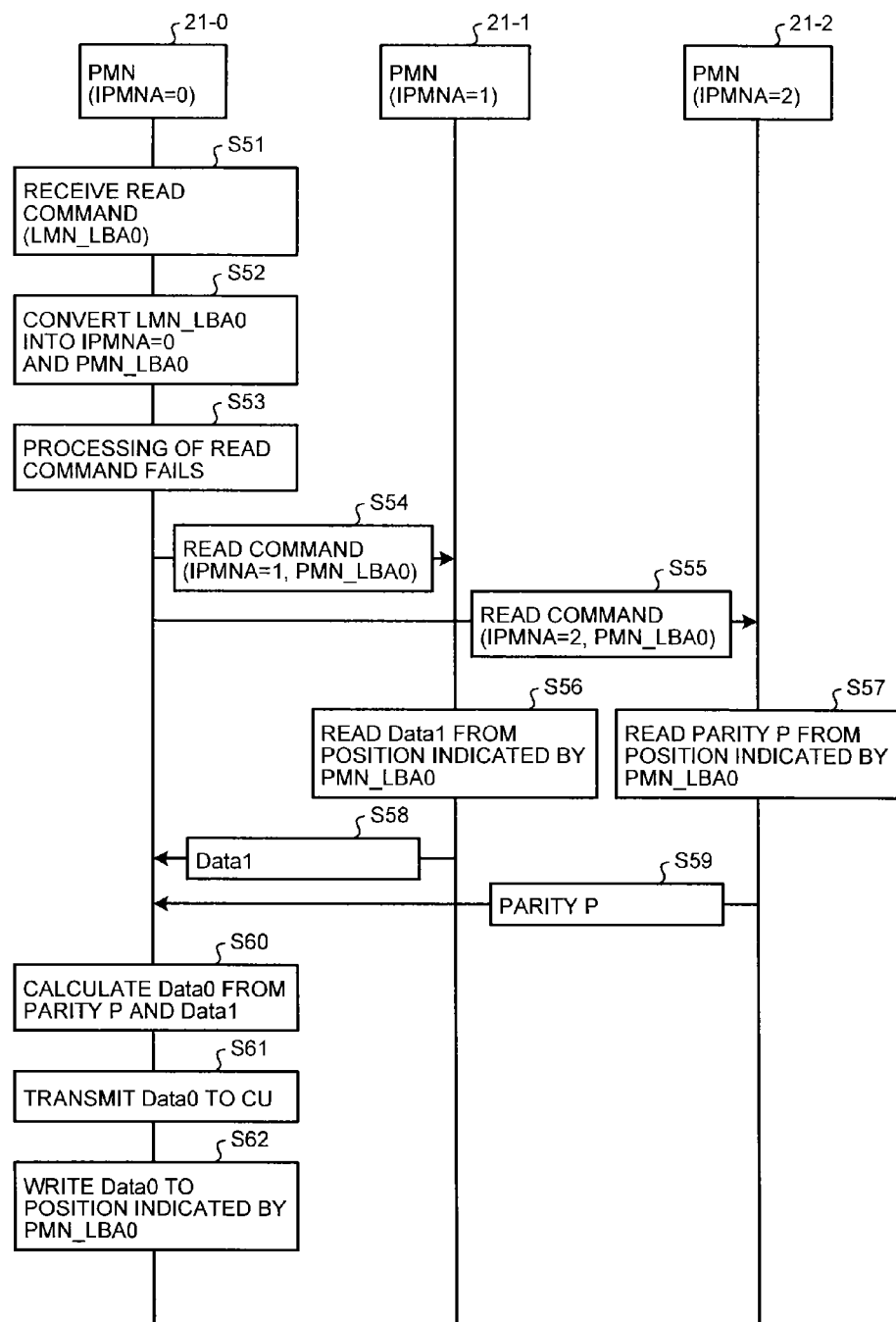
FIG. 15 is a sequence diagram illustrating an example (first reading process) of the processing of a read command from the CU.

FIG. 15 is a sequence diagram illustrating an example (first reading process) of the processing of the read command from the CU 14. When the processing of the read command succeeds, the PMN 21-0 transmitted the read data to the CU 14. Here, a process when the processing of the read command fails will be described. A case in which the processing of the read command fails includes, for example, a case in which the error correction of the read data fails.

First, the PMN 21-0 receives the read command addressed thereto (S51). The read command received in S51 includes at least an LMNA for specifying the LMN 11 including the PMN 21-0 and LMN_LBA0. LMN_LBA0 is converted into IPMNA=0 and PMN_LBA0 by the conversion algorithm 324.

Then, the PMN 21-0 converts LMN_LBA0 into IPMNA=0 and PMN_LBA0 (S52). S52 has been performed in S5, but is added to FIG. 15 for description.

When the processing of the read command fails (S53), the PMN 21-0 transmits a read command to read Data1 and to transmit Data1 to the PMN 21-0 and transmits the read command to the PMN 21-1 (S54). In addition, the PMN 21-0 generates a read command to read the parity P and to transmit the parity P to the PMN 21-0 and transmits the read command to the PMN 21-2 (S55).

When receiving the read command from the PMN 21-0, the PMN 21-1 reads Data1 from the position indicated by PMN_LBA0 (S56). Then, the PMN 21-1 transmits Data1 to the PMN 21-0 (S58). When receiving the read command from the PMN 21-0, the PMN 21-2 reads the parity P from the position indicated by PMN_LBA0 (S57). Then, the PMN 21-2 transmits the parity P to the PMN 21-0 (S59).

When receiving Data1 from the PMN 21-1 and the parity P from the PMN 21-2, the PMN 21-0 calculates Data0 from Data1 and the parity P (S60). Then, the PMN 21-0 transmits the calculated Data0 to the CU 14 (S61). In addition, the PMN 21-0 writes the calculated Data0 to the position indicated by PMN_LBA0 in the overwrite mode (S62).

Figure 16:
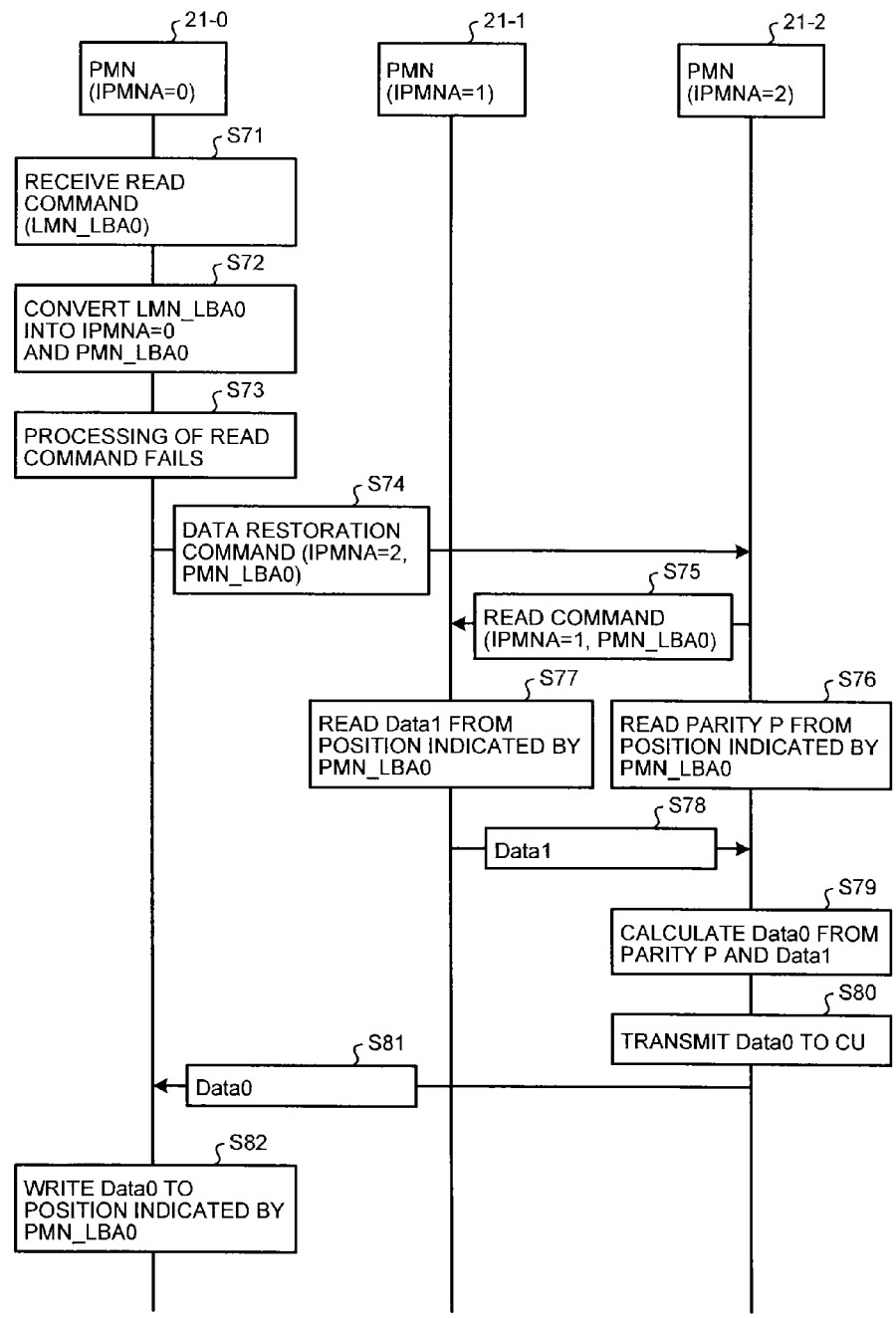
FIG. 16 is a sequence diagram illustrating another example (second reading process) of the processing of the read command from the CU.

FIG. 16 is a sequence diagram illustrating another example (second reading process) of the processing of the read command from the CU 14. S71 to S73 are the same S51 to S53, respectively. After S73, the PMN 21-0 generates a data restoration command to restore data and transmits the data restoration command to the PMN 21-2 (S74). The data restoration command generated in S74 includes at least IPMNA=2 and PMN_LBA0 as information which designates a parity group and indicates the destination of the data restoration command. In addition, the data restoration command generated in S74 may include information indicating that a restoration target is Data0 stored in the PMN 21-0.

When receiving the data restoration command, the PMN 21-2 generates a read command to read Data1 and to transmit Data1 to the PMN 21-2 and transmits the read command to the PMN 21-1 (S75). Then, the PMN 21-2 reads the parity P from the position indicated by PMN_LBA0 (S76).

When receiving the read command from the PMN 21-2, the PMN 21-1 reads Data1 from the position indicated by PMN_LBA0 (S77). Then, the PMN 21-1 transmits Data1 to the PMN 21-2 (S78).

When receiving Data1 from the PMN 21-1, the PMN 21-2 calculates Data0 from Data1 and the parity P (S79) and transmits the calculated Data0 to the CU 14 (S80). In addition, the PMN 21-2 transmits the calculated Data0 to the PMN 21-0 (S81).

When receiving Data0 from the PMN 21-2, the PMN 21-0 writes Data0 to the position indicated by PMN_LBA0 in the overwrite mode (S82).

The PMN 21-0 may transmit the calculated Data0 to the CU 14.

Figure 17:
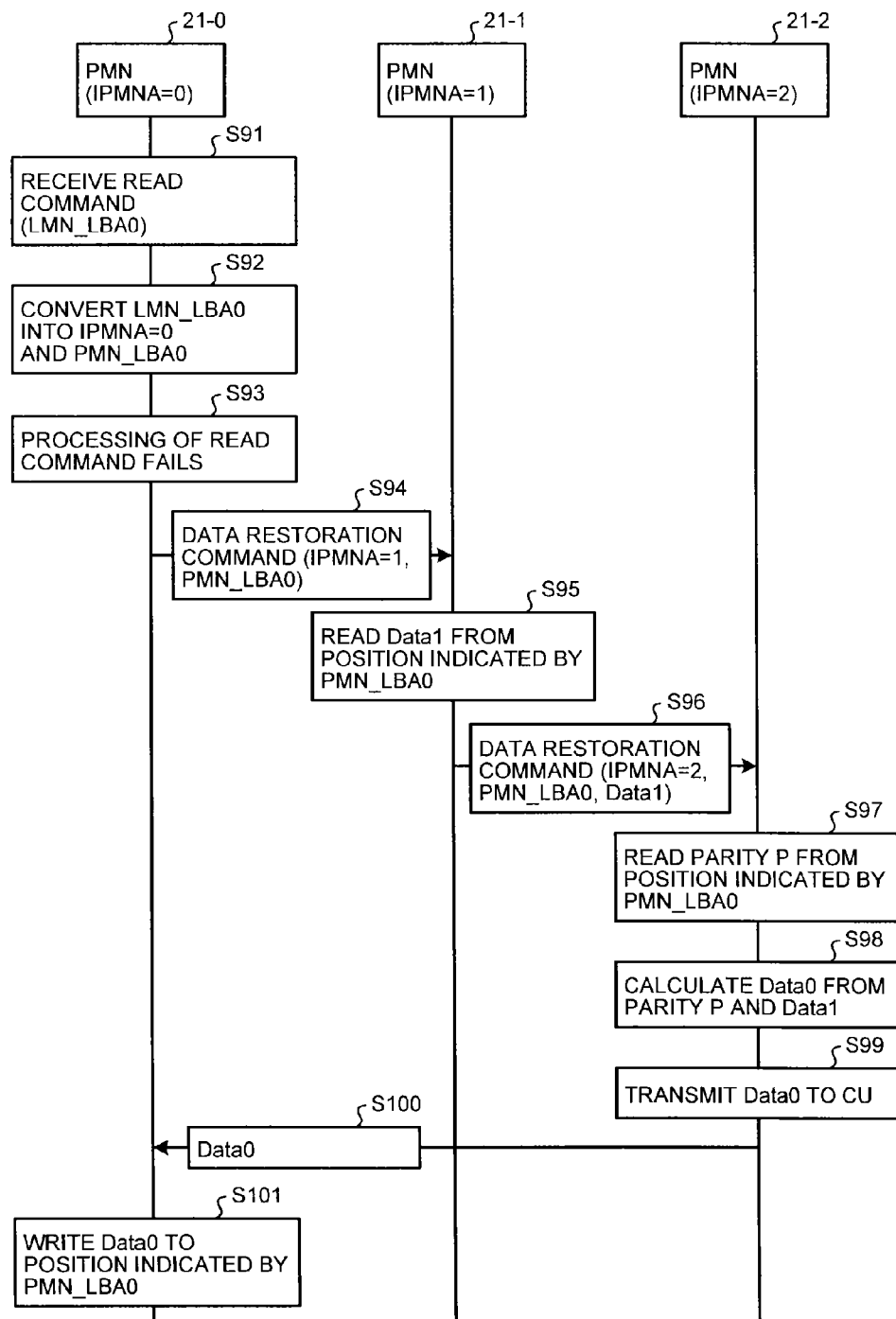
FIG. 17 is a sequence diagram illustrating another example (third reading process) of the processing of the read command from the CU.

FIG. 17 is a sequence diagram illustrating another example (third reading process) of the processing of the read command from the CU 14. S91 to S93 are the same as S51 to S53, respectively. After S93, the PMN 21-0 generates a data restoration command and transmits the data restoration command to the PMN 21-1 (S94). The data restoration command generated in S94 includes at least IPMNA=1 and PMN_LBA0 as information which designates the parity group and indicates the destination of the data restoration command.

When receiving the data restoration command from the PMN 21-0, the PMN 21-1 reads Data1 from the position indicated by PMN_LBA0 (S95). Then, the PMN 21-1 generates a data restoration command and transmits the data restoration command to the PMN 21-2 (S96). The data restoration command generated in S96 includes at least IPMNA=2 and PMN_LBA0 as the information which designates the parity group and indicates the destination of the data restoration command. In addition, the data restoration command generated in S96 includes Data1. The data restoration command generated in S96 may include information indicating that the restoration target is Data0 stored in the PMN 21-0.

When receiving the data restoration command from the PMN 21-1, the PMN 21-2 reads the parity P from the position indicated by PMN_LBA0 (S97). Then, the PMN 21-2 calculates Data0 from Data1 and the parity P (S98) and transmits the calculated Data0 to the CU 14 (S99). In addition, the PMN 21-2 transmits the calculated Data0 to the PMN 21-0 (S100).

When receiving Data0 from the PMN 21-2, the PMN 21-0 writes Data0 to the position indicated by PMN_LBA0 in the overwrite mode (S101).

The PMN 21-0 may transmit the calculated Data0 to the CU 14. As described in the first to third reading processes, when the reading of Data0 fails, each LMN 11 restores Data0 on the basis of the parity P corresponding to Data0. An arbitrary PMN 21 among the PMNs 21 in the same LMN 11 can restore Data0.

As described above, according to the first embodiment, each PMN 21 forms one of a plurality of LMNs 11 together with the other PMNs 21. Each PMN 21 stores Data0 which is written from the server 3 in the first PMN 21 and stores the parity P, which is the redundant data of Data0, in the second PMN 21 different from the first PMN 21. The command from the CU 14 includes the LMNA which designates one LMN 11 and the LMN_LBA which is allocated to each LMN 11 and indicates a position in the memory space. When the LMNA does not designate the LMN 11, the LMN 11 transmits the command to another LMN 11. When the LMNA designates the LMN 11, the LMN 11 calculates the storage position of Data0 in the first PMN 21 on the basis of the LMN_LBA, calculates the storage position of the parity P corresponding to Data0 in the second PMN 11, and accesses each of the calculated storage positions in response to the command. The storage system 1 can restore the lost data, without redundant data being managed by the server 3. Therefore, according to the first embodiment, it is possible to reduce necessary external resources, as compared to when redundant data is managed by the outside. Since each LMN 11 manages the redundant data, the management of the redundant data is dispersed in the storage system 1. Therefore, the performance of the storage system is expected to be improved by scale-out, as compared to a case in which the management of the redundant data is concentrated.

When the redundant data storage system is RAID 1, a copy of data which is written from the server 3 is used as the redundant data.

When the command is the read command, each LMN 11 reads Data0 from the first PMN 21. When the reading fails, each LMN 11 reads the parity P from the second PMN 21 and restores Data0 using the parity P. Therefore, the storage system 1 can restore data written from the server 3, without redundant data being managed by the server 3.

When the command is the write command, each LMN 11 updates Data0 stored in the first PMN 21 and updates the parity P stored in the second PMN 21 with the update of Data0. Therefore, the storage system 1 can manage redundant data, without requiring a redundant data management process of the server 3.

Each PMN 21 calculates the IPMNA and the PMN_LBA on the basis of the LMN_LBA. When a pair of the LMNA and the IPMNA indicates the own PMN 21, access corresponding to the command is performed for the NAND memory 300 in the PMN 21. When a pair of the LMNA and the IPMNA does not indicate the own PMN 21, the PMN 21 transmits the command to another adjacent PMN 21. Therefore, the command is automatically transmitted to as to reach the PMN 21 storing desired data.

When the reading of data fails or when data is written, each PMN 21 can calculate the storage position of the parity P in the second PMN 21. In the example illustrated in FIG. 9, the storage position of the parity P in the second PMN 21 is the same as the storage position of Data0 in the first PMN 21. As such, since each PMN 21 has a function of calculating the storage position of redundant data, the management of the redundant data by the server 3 is not needed.

The first PMN 21 and the second PMN 21 forming each LMN 11 may be mounted on different blade boards 22. In this case, when failure occurs in one PMN 21, the blade board 22 having the defective PMN 21 mounted thereon is replaced. Therefore, it is possible to rebuild data, without losing data stored in the storage system 1.

Second Embodiment

Figure 18:
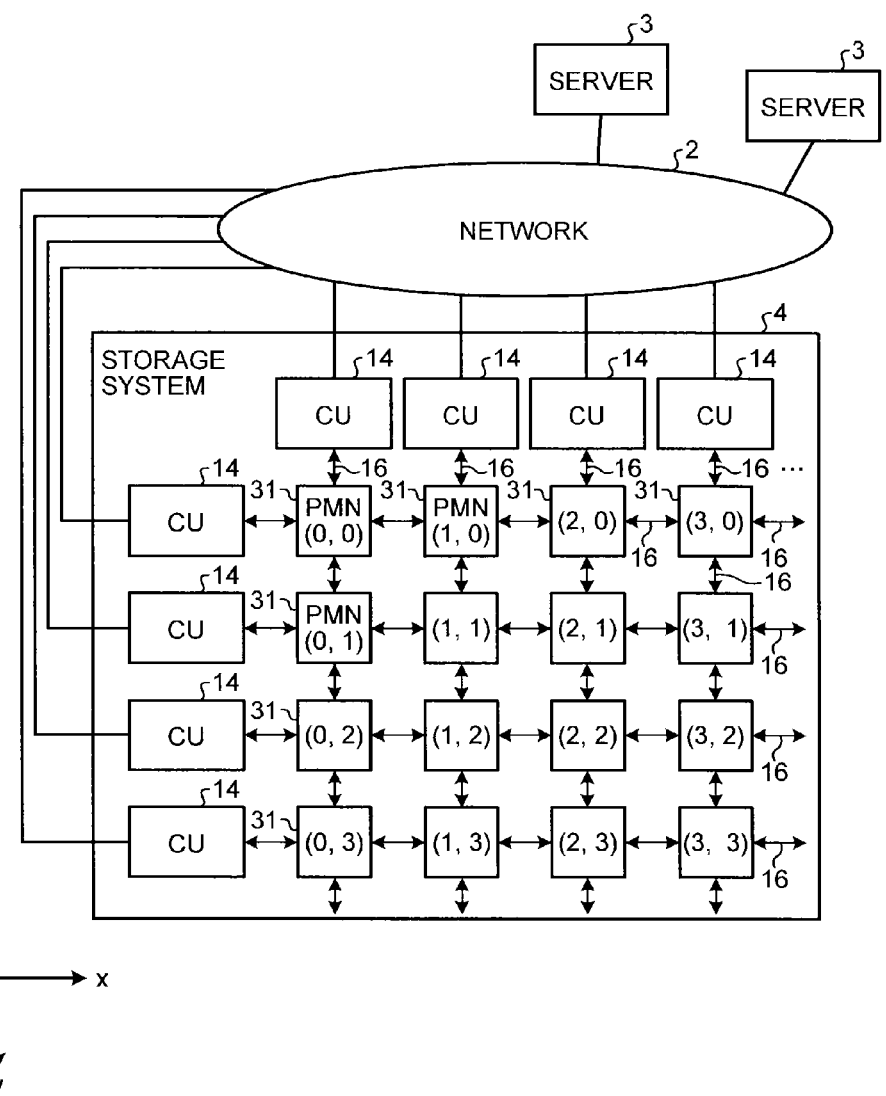
FIG. 18 is a diagram illustrating an example of the structure of a storage system according to a second embodiment.

FIG. 18 is a diagram illustrating an example of the structure of a storage system according to a second embodiment. Hereinafter, in the second embodiment, the same components as those in the first embodiment are denoted by the same reference numerals as those in the first embodiment and the description thereof will not be repeated.

A storage system 4 is connected to one or more servers 3 through a network 2. The server 3 can write data to the storage system 4 or read data from the storage system 4. That is, the server 3 functions as a host of the storage system 4. An arbitrary computer can function as the host of the storage system 4. The I/O access of the server 3 to the storage system 4 is performed through the network 2.

The storage system 4 includes a plurality of memory nodes (MNs) 31 and one or more control units (CUs) 14. The storage system 4 can distribute and store data in a plurality of MNs 31. In the example illustrated in FIG. 18, each MN 31 is arranged at a lattice point of a rectangular lattice. Each CU 14 is arranged in the outer periphery of the array of the MNs 31. The coordinates of the lattice point are represented by coordinates (x, y). The positional information of the MN 31 arranged at the lattice point corresponds to the coordinates of the lattice point and is represented by a node address (x, y). In the example illustrated in FIG. 18, the MN 31 which is disposed at the upper left corner has a node address (0, 0) of the origin. When each MN 31 is moved in the horizontal direction (X direction) and the vertical direction (Y direction), the node address (NA) which is represented by an integer value increases and decreases. Each CU 14 may have the NA. For example, of two CUs 14 which are connected to the origin MN 31, the CU 14 which is connected in the X direction may have an NA (−1, 0) and the CU 14 which is connected to in the Y direction may have an NA (0, −1). Hereinafter, the MN 31 represented by an NA (xD, yD) is referred to as an MN (xD, yD).

Similarly to the arrangement aspect of the LMNs 11 in the first embodiment, the arrangement aspect of the MNs 31 is not limited to the aspect in which MNs 31 are arranged at the lattice points of a two-dimensional rectangular lattice. In the following description, for simplicity, it is assumed that the MNs 31 do not form the LMN 11. The node address may be replaced with an LMNA and a data address may be replaced with a combination of the LMNA and an LMN_LBA. In this case, even when the LMN 11 is formed as in the first embodiment, the second embodiment can be applied.

Each MN 31 includes two or more input/output ports 16. Each MN 31 is connected to other MNs 31 which are adjacent in two or more different directions or the CUs 14 through the input/output ports 16. In FIG. 18, an MN (0, 0) is connected to an MN (1, 0), an MN (0, 1), and two CUs 14.

In the second embodiment, the server 3 can designate data using an arbitrary character string (key). When the server 3 designates data for the storage system 4, using an independent address system different from an address system (a data address expression method which will be described below) used in the storage system 4, the address used by the server 3 can be used as a key. The key is hashed in the CU 14 and the hashed key is converted into an address (hereinafter, referred to as a data address) which can specify the MN 31 and a position in a storage area included in the MN 31. The hashed key is simply referred to as a key. The key is converted into the data address by a conversion table.

Figure 19:
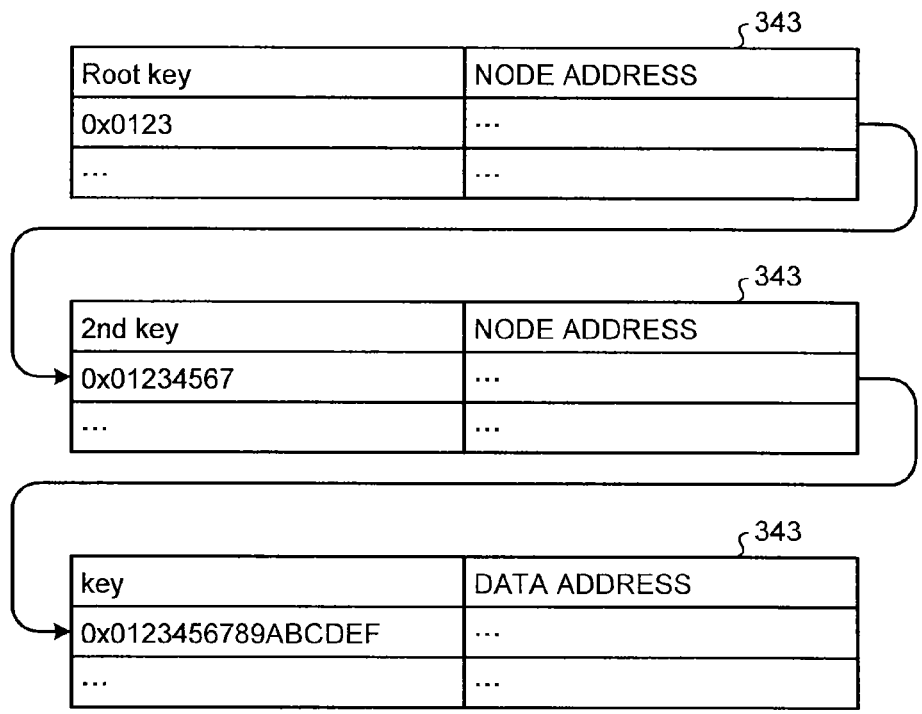
FIG. 19 is a diagram illustrating an example of the structure of a conversion table.
Figure 20:
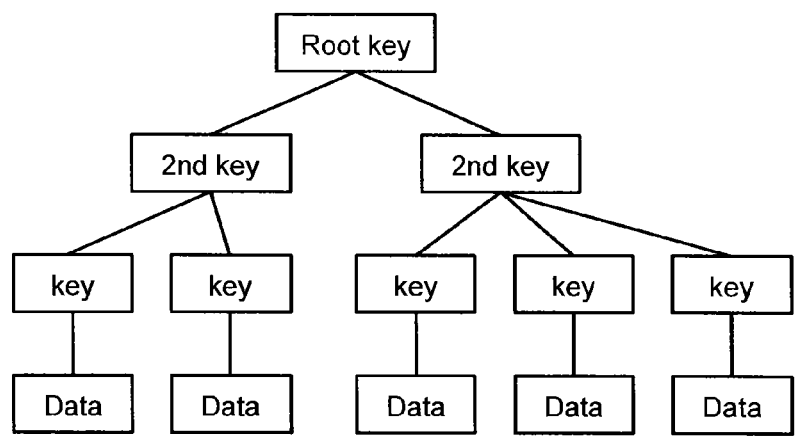
FIG. 20 is a diagram illustrating an example of the structure of the conversion table.

FIGS. 19 and 20 are diagrams illustrating an example of the structure of the conversion table. A conversion table 343 is divided into a plurality of parts. The plurality of divided conversion tables 343 have a tree-structure link relationship therebetween. The lowest conversion table 343 (the conversion table 343 of a leaf node) stores the correspondence relationship between the key and the data address. The conversion tables 343 except for the uppermost conversion table 343 store the correspondence relationship between an abstracted key and the node address of the MN 31 which stores the conversion table 343 of a child node. The upper conversion table 343 stores the key which is more abstracted than that in the lower conversion table 343. The upper conversion table 343 includes an entry for each abstracted key and can manage a large number of keys with a small number of entries. The lower conversion table 343 is divided into a plurality of parts. Therefore, the number of entries in each conversion table 343 is reduced to a predetermined value or less.

In the example illustrated in FIGS. 19 and 20, the conversion tables 343 are connected to each other by a link relationship with a three-layer tree structure. It is assumed that the conversion table 343 of a root node is a zeroth-layer conversion table and the layer value, which is an integer value, increases toward the lower layer. The zeroth-layer conversion table stores the correspondence relationship between the most abstracted key and the node address stored in a first-layer conversion table. Here, the term "abstraction" means an operation of shifting the key to the right. As the amount of shift by the shift operation increases, the degree of abstraction increases. The first-layer conversion table stores the correspondence relationship between a moderately-abstracted key and the node address stored in a second-layer conversion table. The second-layer conversion table stores the correspondence relationship between the key which is not abstracted at all and the data address. Hereinafter, in some cases, the zeroth-layer conversion table is referred to as a Root K2K and the key stored in the zeroth-layer conversion table is referred to as a root key. In addition, in some cases, the first-layer conversion table is referred to as a 2nd K2K and the key stored in the first-layer conversion table is referred to as a second key (2nd key). In some cases, the second-layer conversion table is referred to as a K2A.

The data address may be any information as long as it can specify each MN 31 among the MNs 31 in the storage system 4 and a position in the memory space in each MN 31. For example, the data address includes the node address and an address in the node which logically or physically indicates a position in the NAND memory 300 in each MN 31. Here, it is assumed that the address in the node logically indicates a position in the NAND memory 300 in each MN 31 and is converted into a physical position in the NAND memory 300 in the MN 31 on the basis of the meta data 323.

Figure 21:
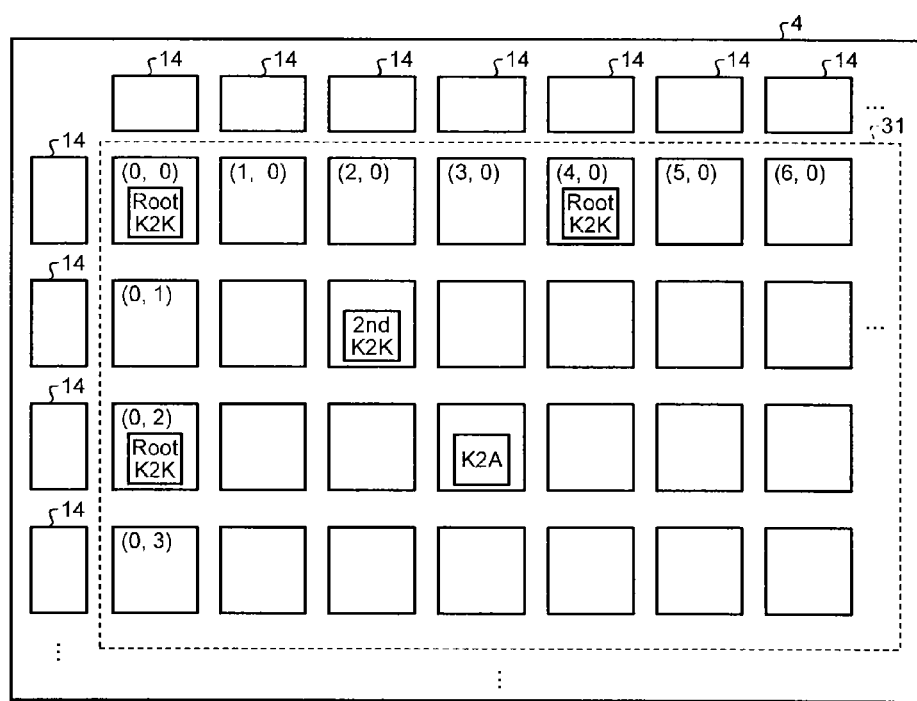
FIG. 21 is a diagram illustrating an MN in which the conversion table is stored.

FIG. 21 is a diagram illustrating the MN 31 which stores the conversion table. As described above, when the conversion table is hierarchized, access is concentrated on the MN 31 which stores the Root K2K. In the second embodiment, the Root K2K is multiplexed in order to disperse the access to the MN 31 which stores the Root K2K and the Root K2Ks are stored in different MNs 31. A plurality of MNs 31 storing the Root K2K are predetermined and fixed to specific MNs 31. The multiplexed Root K2Ks are synchronized with each other. Any synchronization method may be used. In addition, all Root K2Ks may be locked at a predetermined time and synchronous processing may be performed between the Root K2Ks. No Root K2K may be locked and synchronous processing may not be performed between the Root K2Ks. In the example illustrated in FIG. 21, the same Root K2K is stored in the MN (0, 0), the MN (4, 0) and the MN (0, 2).

Figure 22:
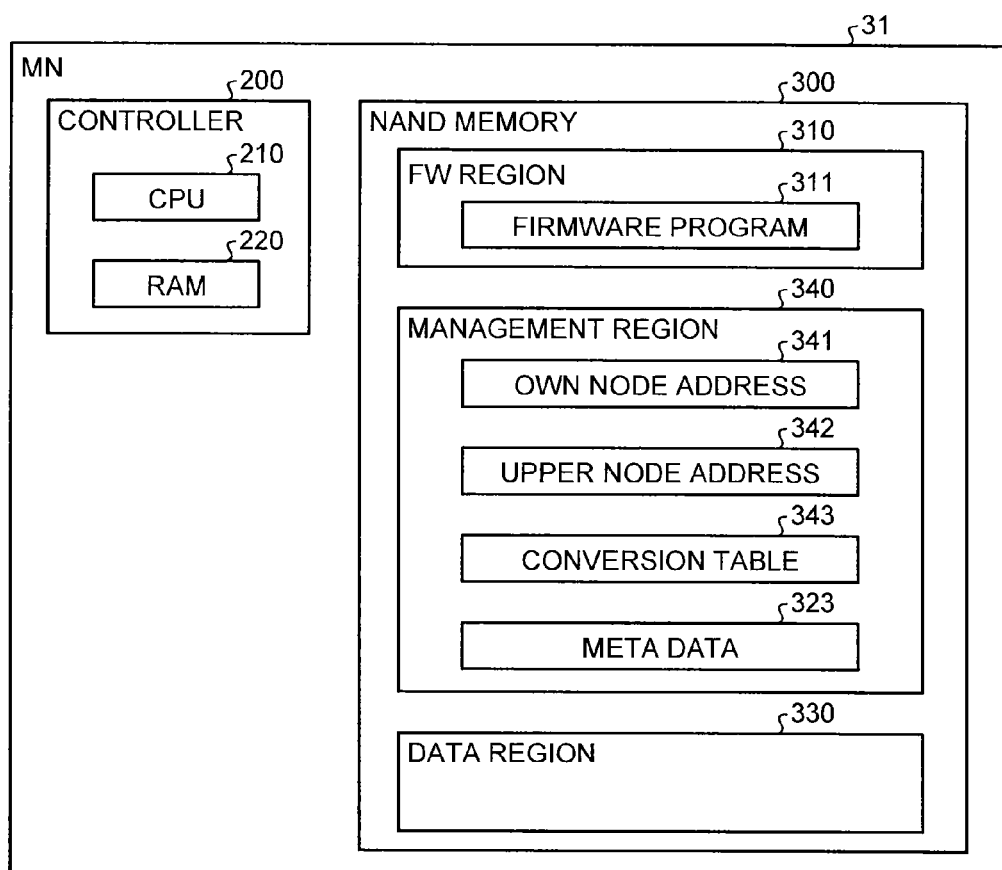
FIG. 22 is a diagram illustrating an example of the structure of the MN according to the second embodiment, with attention paid to a memory structure.

FIG. 22 is a diagram illustrating an example of the structure of the MN 31 according to the second embodiment, with attention paid to a memory structure. The MN 31 includes a controller 200 and NAND memory 300 serving as a storage memory. The controller 200 includes a CPU 210 and RAM 220.

The NAND memory 300 includes an FW region 310, a management region 340, and a data region 330. The FW region 310 stores a firmware program 311 executed by the CPU 210 in advance. The management region 340 stores a own node address 341, an upper node address 342, a conversion table 343, and meta data 323. The own node address 341 is a node address allocated to the own MN 31. The upper node address 342 is a node address indicating the MN 31 which stores the conversion table 343 of the parent node among the conversion tables 343 stored in the own MN 31.

FIG. 22 illustrates the structure of the MN 31 which stores the 2nd K2K or the K2A. The MN 31 which stores the Root K2K does not store the upper node address 342 in the management region 340 since the Root K2K is the conversion table 343 of the root node. The MN 31 which does not store the conversion table 343 does not store the upper node address 342 in the management region 340.

Figure 23:
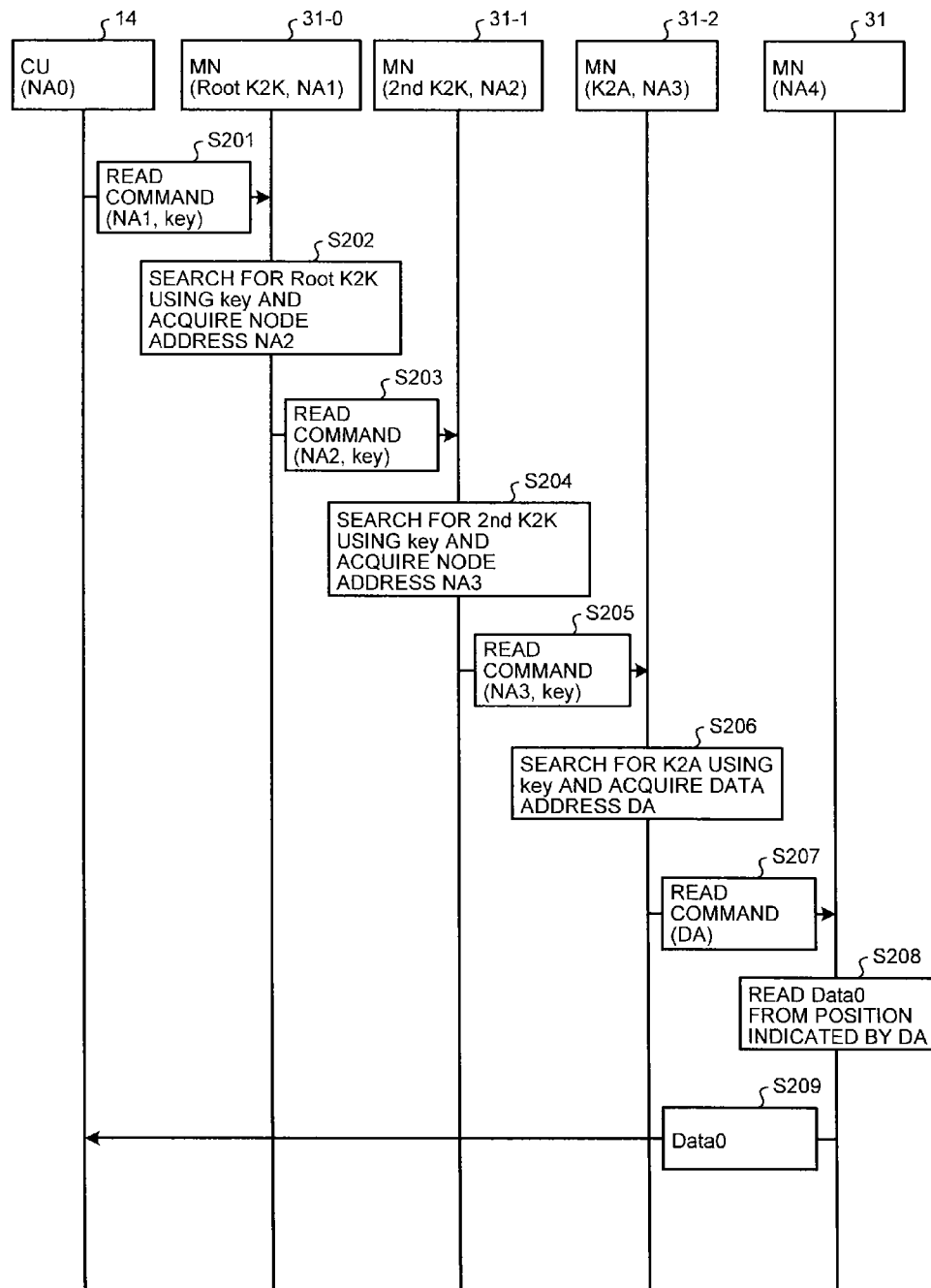
FIG. 23 is a sequence diagram illustrating an example of the processing of a read command from a CU in the second embodiment.

FIG. 23 is a sequence diagram illustrating an example of the processing of a read command from the CU 14 in the second embodiment. Here, the MN 31 which stores the Root K2K is denoted by a reference numeral 31-0, the MN 31 which stores the 2nd K2K is denoted by a reference numeral 31-1, and the MN 31 which stores the K2A is denoted by a reference numeral 31-2 to distinguish a plurality of MNs 31 storing the conversion tables in different layers.

First, the CU 14 transmits a read command to the MN 31-0 (S201). The read command transmitted in S201 includes a node address NA1, which is information indicating the destination, and a key. The node address NA1 is a node address which is allocated to one of a plurality of MNs 31-0. The read command transmitted in S201 includes a node address NA0 as information indicating a transmission source. However, the node address NA0 is omitted here. The node address NA0 is a node address which is allocated to the CU 14 which is the transmission source of the read command. The CU 14 can determine a destination MN 31-0 among a plurality of MNs 31-0 using any method.

When receiving the command, each MN 31 compares the node address or data address of the destination with the own node address 341 to determine whether the MN 31 is the destination of the command. When the destination is represented by the data address, each MN 31 calculates the node address from the data address of the destination and compares the calculated node address with the own node address 341. When the command is not addressed to the MN 31, the MN 31 transmits the command to an adjacent MN 31. When the node address indicates a physical arrangement position, the destination MN 31 is determined on the basis of the positional relationship between the node address of the destination and the own node address 341. For example, each MN 31 determines a routing destination MN 31 such that the number of times commands are transmitted from the MN 31 to the destination MN 31 is at a minimum. When an MN 31, from which the command is transmitted to the destination MN 31 the smallest number of times, is defective or busy, each MN 31 determines a routing destination MN 31 such that the command bypasses the defective or busy MN 31.

When receiving the read command from the CU 14, the MN 31-0 having the node address NA1 allocated thereto searches for the Root K2K using the key to acquire a node address NA2 (S202). Then, the MN 31-0 rewrites the destination to the node address NA2 and transmits the read command (S203).

When receiving the read command transmitted from the MN 31-0, the MN 31-1 having the node address NA2 allocated thereto searches for the 2nd K2K using the key to acquire a node address NA3 (S204). Then, the MN 31-1 rewrites the destination to the node address NA3 and transmits the read command (S205).

When receiving the read command transmitted from the MN 31-1, the MN 31-2 having the node address NA3 allocated thereto searches for the K2A using the key to acquire a data address DA (S206). Then, the MN 31-2 rewrites the destination to the data address DA and transmits the read command (S207).

When receiving the read command from the MN 31-2, the MN 31 specified by the data address DA reads Data0 from the position indicated by the data address DA (S208). Then, the MN 31 specified by the data address DA transmits Data0 to the CU 14 as a destination (S209).

Figure 24:
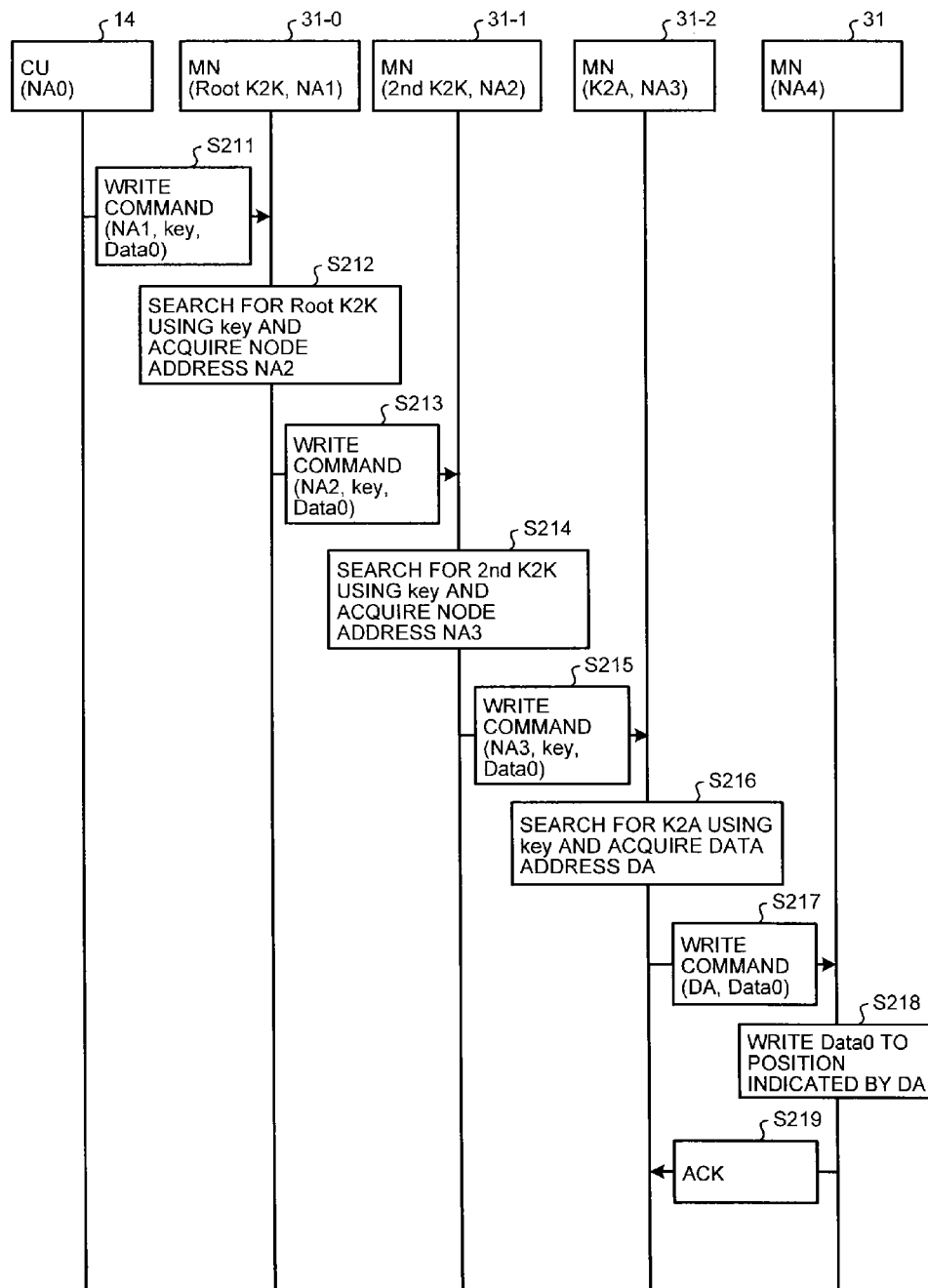
FIG. 24 is a sequence diagram illustrating an example of the processing of a write command from the CU in the second embodiment.

FIG. 24 is a sequence diagram illustrating an example of the processing of a write command from the CU 14 in the second embodiment. First, the CU 14 transmits the write command to one MN 31-0 as a destination (S211). The write command transmitted in S211 includes a node address NA1 which is information indicating the destination, a key, and write data Data0.

When receiving the write command transmitted from the CU 14, the MN 31-0 having the node address NA1 allocated thereto searches for the Root K2K using the key to acquire a node address NA2 (S212). Then, the MN 31-0 rewrites the destination to the node address NA2 and transmits the write command (S213).

When receiving the write command transmitted from the MN 31-0, the MN 31-1 having the node address NA2 allocated thereto searches for the 2nd K2K using the key to acquire a node address NA3 (S214). Then, the MN 31-1 rewrites the destination to the node address NA3 and transmits the write command (S215).

When receiving the write command transmitted from the MN 31-1, the MN 31-2 having the node address NA3 allocated thereto searches for the K2A using the key to acquire the data address DA (S216). Then, the MN 31-2 rewrites the destination to the data address DA and transmits the write command (S217). The write command transmitted in S217 may include the node address NA3 as information indicating a transmission source.

When receiving the write command transmitted from the MN 31-2, the MN 31 specified by the data address DA writes Data0 to the position indicated by the data address DA (S218). Then, the MN 31 specified by the data address DA transmits ACK, which is information indicating that Data0 has been correctly received, to the MN 31-2, which has transmitted the write command in S217, as a destination (S219).

When the address in the node, which is a write destination, is changed or when storage capacity is insufficient, the MN 31 specified by the data address DA can transmit a notice indicating that the address has been changed or storage capacity is insufficient to the MN 31-2, which has transmitted the write command in S217, as a destination. When receiving the notice, the MN 31-2 may divide Data0 and transmit a portion of the divided Data0 to the MN 31 specified by the data address DA or transmit other portions to another MN 31. In addition, when receiving the notice, the MN 31-2 may transmit Data0 to another MN 31. When the data address of the write destination of Data0 has been changed, the MN 31-2 which has received the notice updates the K2A with the change in the data address. When Data0 is divided or when a new key is designated, the MN 31-2 can create a new entry of the K2A. When a new entry is created, the number of entries in the K2A increases.

Figure 25:
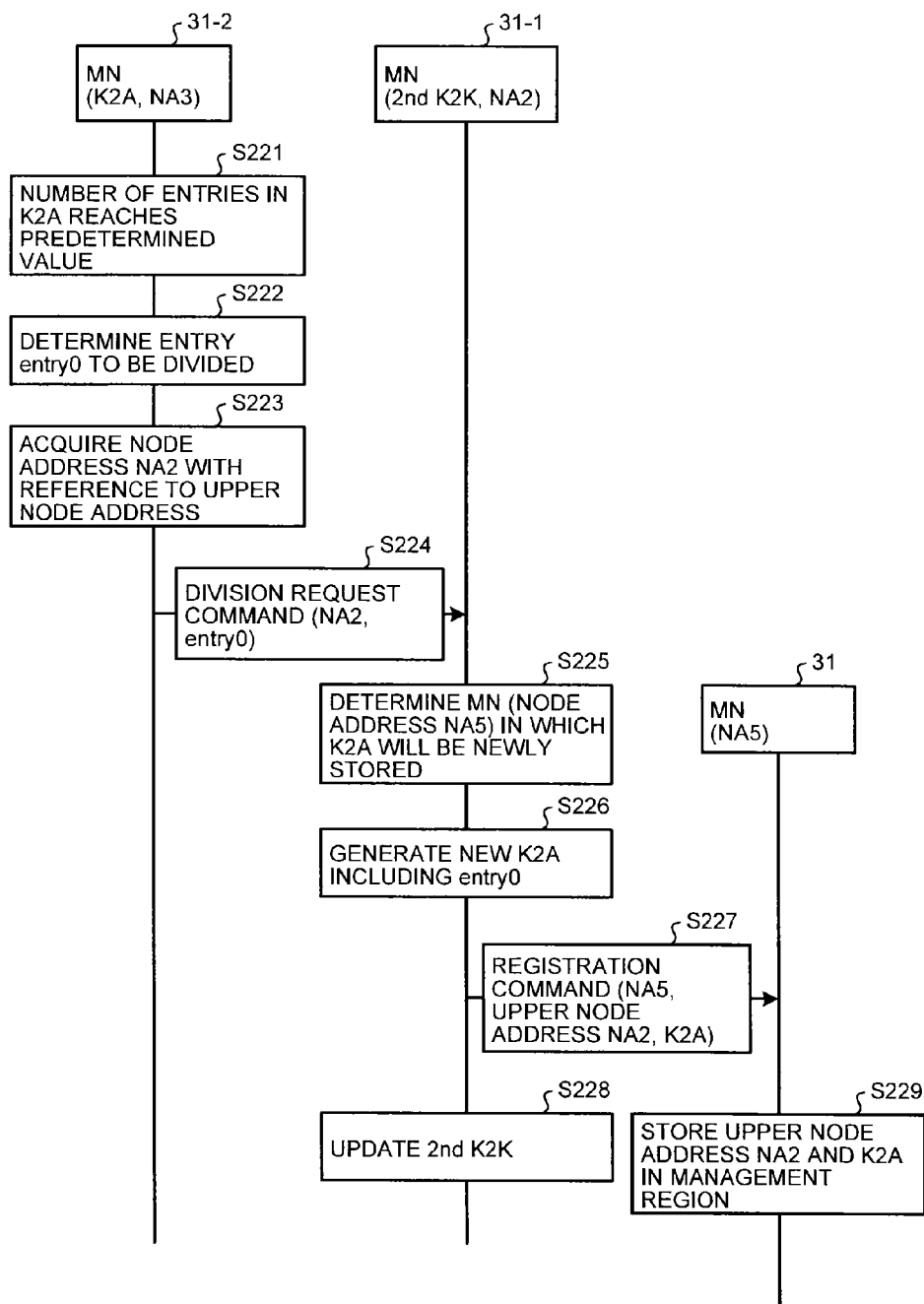
FIG. 25 is a sequence diagram illustrating an example of a process when the number of entries in the conversion table reaches a predetermined value.

FIG. 25 is a sequence diagram illustrating a process when the number of entries in the conversion table reaches a predetermined value. Here, a case in which the number of entries in the K2A reaches a predetermined value will be described. However, the same process is performed even in a case in which the number of entries in the 2nd K2K reaches a predetermined value.

When the number of entries in the K2A reaches the predetermined value (S221), the MN 31-2 selects entry0 (S222). Here, entry0 is the entry to be divided among the entries forming the K2A. In addition, a plurality of entries to be divided may be selected.

Then, the MN 31-2 acquires the node address NA2 with reference to the upper node address 342 (S223). The MN 31-2 generates a division request command and transmits the division request command to the node address NA2 as a destination (S224). The division request command generated in S224 includes entry0.

When receiving the division request command, the MN 31-1 having the node address NA2 allocated thereto determines an MN 31 in which the K2A will be newly stored (S225). The MN 31 in which the K2A will be newly stored may be determined by any method. For example, the MN 31 in which the K2A will be newly stored is determined from the MNs 31 which does not store the conversion table. It is assumed that the node address of the determined MN 31 is NA5.

Then, the MN 31-1 newly generates the K2A from entry0 (S226). Then, the MN 31-1 generates a registration command to store the node address NA2 as the upper node address 342 and the K2A, which is generated in S226, as the conversion table 343 in the management region 340 of the MN 31 having the node address NA5 allocated thereto and transmits the registration command (S227).

Then, the MN 31-1 updates the 2nd K2K (S228). Then, the MN 31 having the node address NA5 allocated thereto stores the node address NA5 as the upper node address 342 and the transmitted K2A as the conversion table 343 in its own management region 340 (S229). Then, the MN 31 having the node address NA5 allocated thereto functions as the MN 31 which stores the K2A.

As such, when the number of entries in the conversion table 343 is excessive, a portion of the conversion table 343 with the excessive entries is divided and stored in another MN 31. The conversion table 343 with the excessive entries may be divided by the conversion table 343 which is a parent node of the conversion table 343 with the excessive entries. An entry is added to the 2nd K2K in S228.

When the conversion table 343 (here, the 2nd K2K) of the internal node has excessive entries, the 2nd K2K with the excessive entries is divided and stored in another MN 31, similarly to when the K2A has excessive entries. When the conversion table 343 of the internal node is divided, the upper node address 342 set to the MN 31 which stores the conversion table 343 of the child node of the divided conversion table 343 needs to be changed. For example, the MN 31 which stores the divided conversion table 343 transmits a registration update command to update information in the management region 340 to the conversion table 343 of the child node of the divided conversion table 343 to change the upper node address 342. In addition, the MN 31 which stores the conversion table 343 of the parent node of the divided conversion table 343 may transmit the registration update command to the conversion table 343 of the child node of the divided conversion table 343 to change the upper node address 342.

Figure 26:
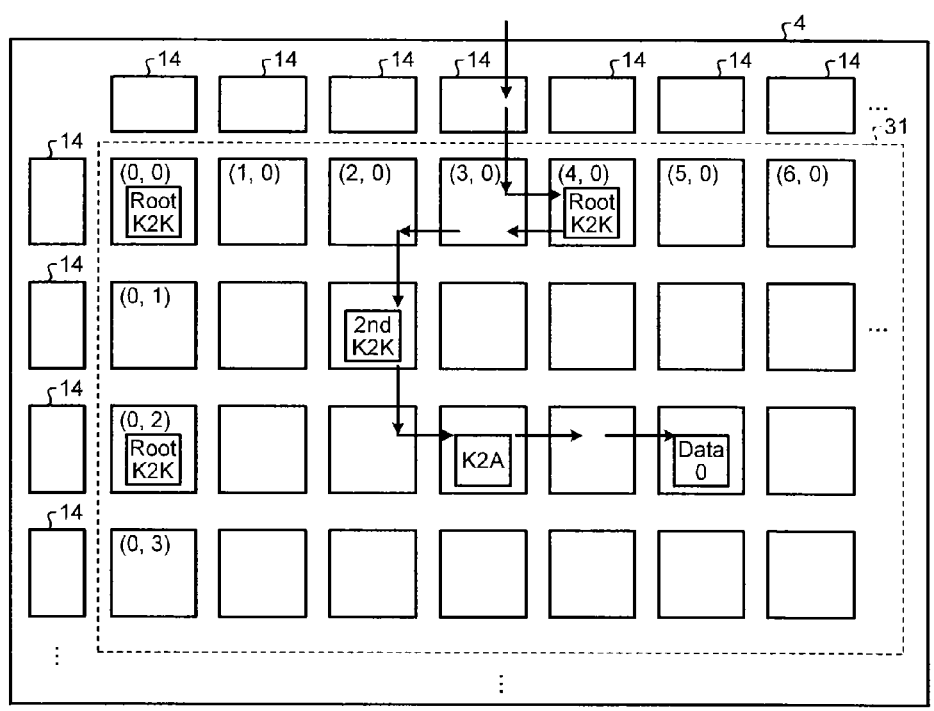
FIG. 26 is a diagram illustrating a transmission path of the read command when a reading process is performed.

FIG. 26 is a diagram illustrating a transmission path of the read command when a reading process is performed. When a data read request is input from the server 3, the CU 14 generates a read command to designate an MN (4, 0) and transmits the read command to an MN (3, 0). The read command received by the MN (3, 0) is transmitted to the MN (4, 0). The MN (4, 0) specifies an MN (2, 1) which stores the 2nd K2K on the basis of a key included in the read command. Then, the MN (4, 0) rewrites the destination of the read command to the MN (2, 1) and transmits the read command to the MN (3, 0). The read command which is received by the MN (3, 0) again is transmitted to the MN (2, 1) through an MN (2, 0). The MN (2, 1) specifies an MN (3, 2) which stores the K2A on the basis of the key included in the read command. Then, the MN (2, 1) rewrites the destination of the read command to the MN (3, 2) and transmits the read command to an MN (2, 2). The read command received by the MN (2, 2) is transmitted to the MN (3, 2). The MN (3, 2) specifies a data address on the basis of the key included in the read command. Then, the MN (3, 2) rewrites the destination of the read command to the specified data address and transmits the read command to an MN (4, 2). The read command received by the MN (4, 2) is transmitted to an MN (5, 2). The MN (5, 2) reads data from the position indicated by the data address.

FIG. 27 is a diagram illustrating a transmission path of data when the reading process is performed. The MN (5, 2) transmits the read data to the MN (4, 2) such that the destination of the read data is the CU 14 which is the transmission source of the read command. The data received by the MN (4, 2) passes through the MN (3, 2), the MN (3, 1), and the MN (3, 0) in this order and is then transmitted to the CU 14 which is the transmission source of the read command. The CU 14 transmits the received data to the server 3. The read data may not pass through the transmission path of the read command or it may not pass through the MN (4, 0), the MN (2, 1) storing the 2nd K2K, or the MN (3, 2) storing the K2A. In addition, the MN (5, 2) may transmit the read data to the CU 14, which is not the transmission source of the read command, as a destination.

Since the transmission path of the write command during a writing process is the same as the transmission path of the read command, the description thereof will not be repeated.

FIG. 28 is a diagram illustrating the transmission path of ACK during the writing process. As illustrated in FIG. 28, after writing data to the position indicated by the data address, the MN (5, 2) generates the ACK to be addressed to the MN (3, 2) and transmits the ACK to the MN (4, 2). When receiving the ACK, the MN (4, 2) transmits the ACK to the MN (3, 2). Alternatively, the MN (5, 2) may transmit ACK to the CU 14 which is a destination. In this case, the ACK may not pass through the MN (3, 2).

As described above, according to the second embodiment, the conversion table 343 in which the correspondence relationship between the key and the data address is recorded is divided into a plurality of conversion tables 343 having a three structure link relation therebetween and the plurality of divided conversion tables 343 are stored in different MNs 31. When receiving a command addressed to each MN 31 storing the conversion tables 343, each MN 31 searches for the conversion table 343 using the key included in the command and transmits the command to the searched address as a destination. Here, a plurality of conversion tables 343 of the root node are made and stored in different MNs 31. The CU 14 transmits the command to one of the MNs 31-0, which store the conversion table 343 of the root node, as an initial destination. Therefore, the server 3 can access the data stored in the storage system 4 with one I/O access operation for designating the key. That is, it is possible to reduce the number of I/O accesses between the server 3 and the storage system 4, as compared to a case in which the server 3 performs the I/O access operation for converting the key to the data address for the storage system 4 and then performs I/O access to the converted data address. That is, according to the second embodiment, since the load of the network 2 is reduced, it is possible to reduce necessary external resources. In addition, since the conversion of the key into the data address is dispersed and performed, the performance of the storage system is expected to be improved by scale-out, as compared to when the conversion is concentrated.

According to the second embodiment, the conversion table 343 of the root node is multiplexed and stored in different MNs 31. Therefore, it is possible to disperse access to the MN 31-0 which stores the conversion table 343 of the root node, as compared to a case in which the conversion table 343 of the root node is not multiplexed. As a result, it is possible to prevent deterioration of the function due to the concentration of access to the MN 31-0 which stores the conversion table 343 of the root node. In addition, since a plurality of conversion tables 343 having the tree-structure link relationship therebetween are dispersed and stored in different MNs 31, the process of searching for the data address is dispersed and performed by a plurality of MNs 31. Therefore, the capability of searching for the data address is improved.

Third Embodiment

For example, a tree structure with a variable hierarchy depth, such as a B-tree, has been known. When the order (the order is equal to the number of entries) of the root node of the tree structure reaches a predetermined value, the root node is divided and the hierarchy depth is increased by one step. According to the third embodiment, a conversion table is divided into a plurality of hierarchies and the hierarchy depth of the conversion table is changed. A storage system according to the third embodiment includes the same components as that according to the second embodiment except for the structure of a search table. In this embodiment, in the following description, the components have the same names and reference numerals as those in the second embodiment.

Figure 29:
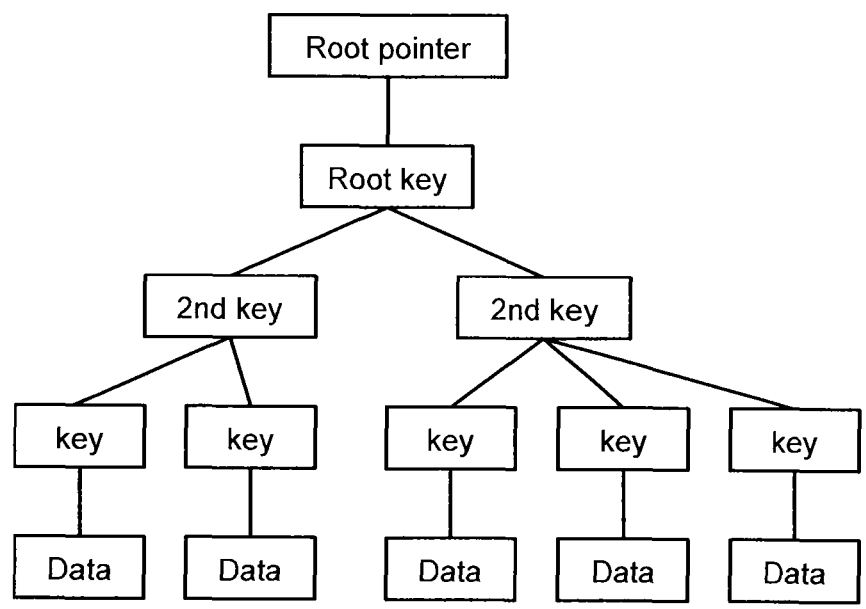
FIG. 29 is a diagram illustrating an example of the structure of a conversion table according to a third embodiment.

FIG. 29 is a diagram illustrating an example of the structure of the conversion table according to the third embodiment. According to the third embodiment, a specific MN 31 stores a list of root pointers indicating the node addresses of MNs 31-0 storing the Root K2K. A plurality of root pointer lists are made and stored in different MNs 31. A plurality of MNs 31 storing the root pointer are predetermined and fixed to specific MNs 31. The Root K2K is multiplexed and the multiplexed Root K2Ks are stored in different MNs 31 (MNs 31-0). In the third embodiment, the MN 31-0 stores an upper node address 342, which is at least one of the node addresses of the MNs 31 storing the root pointer, in a management region 340.

Figure 30:
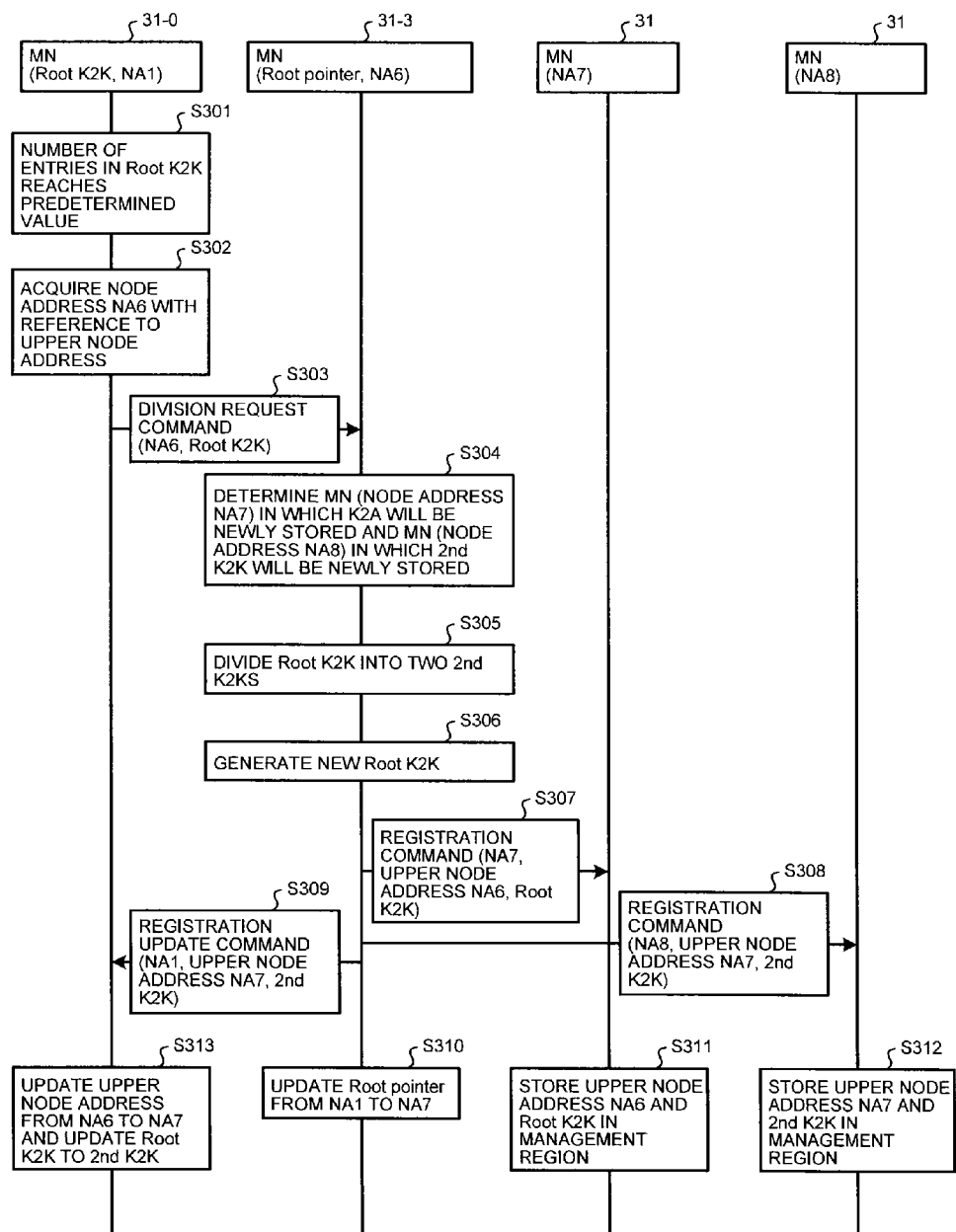
FIG. 30 is a sequence diagram illustrating an example of a process when the number of entries in Root K2K reaches a predetermined value.

FIG. 30 is a sequence diagram illustrating a process when the number of entries in the Root K2K reaches a predetermined value. Here, the MN 31 which stores the root pointer is denoted by reference numeral 31-3 so as to be distinguished from the MN 31 which stores the conversion table and the MN 31 which does not store the conversion table.

First, when the number of entries in the Root K2K is greater than a predetermined value (S301), the MN 31-0 acquires a node address NA6 with reference to the upper node address 342 (S302). The MN 31-0 generates a division request command having the node address NA6 as information indicating a destination and transmits the division request command (S303). The division request command generated in S303 includes the Root K2K. A node address NA6 is a node address which is allocated to one of MNs 31-3. The root pointer stored in the MN 31-3 having the node address NA6 allocated thereto indicates a node address NA1 at this point of time.

When receiving the division request command, the MN 31-3 having the node address NA6 allocated thereto determines an MN 31 in which the Root K2K will be newly stored and an MN 31 in which the 2nd K2K will be newly stored (S304). It is assumed that the node address of the MN 31 in which the Root K2K is newly stored is NA7 and the node address of the MN 31 in which the 2nd K2K is newly stored is NA8.

Then, the MN 31-3 divides the Root K2K into two 2nd K2Ks (S305) and generates a new Root K2K in which the division is reflected (S306). Then, the MN 31-3 transmits a registration command to each of the MN 31 having the node address NA7 allocated thereto and the MN 31 having the node address NA8 allocated thereto as destinations (S307 and S308). In addition, the MN 31-3 transmits a registration update command to the MN 31-0 as a destination (S309). The registration command transmitted to the MN 31 having the node address NA7 allocated thereto is used to store the node address NA6 as the upper node address 342 and the Root K2K which is newly generated in S306 as the conversion table 343. The registration command transmitted to the MN 31 having a node address NA88 allocated thereto is used to store the node address NA7 as the upper node address 342 and one of the two 2nd K2Ks which is generated in S305 as the conversion table 343. The registration update command generated in S309 is used to update the upper node address 342 to the node address NA7 and to update the conversion table 343 to the other of the two 2nd K2Ks generated in S305.

Then, the MN 31-3 updates the root pointer from the node address NA1 to the node address NA7 (S310).

When receiving the registration command, the MN 31 having the node address NA7 allocated thereto stores the node address NA6 as the upper node address 342 and the transmitted Root K2K as the conversion table 343 in its own management region 340 (S311). Then, the MN 31 having the node address NA7 allocated thereto functions as the MN 31 storing the Root K2K.

When receiving the registration command, the MN 31 having the node address NA8 allocated thereto stores the node address NA7 as the upper node address 342 and the transmitted 2nd K2K as the conversion table 343 in its own management region 340 (S312). Then, the MN 31 having the node address NA8 allocated thereto functions as the MN 31 storing the 2nd K2K.

When receiving the registration update command, the MN 31-0 updates the upper node address 342 from the node address NA6 to the node address NA7 and updates the conversion table 343 from the Root K2K to the 2nd K2K (S313). Then, the MN 31-0 functions as the MN 31 storing the 2nd K2K.

As such, according to the third embodiment, the root pointer indicating the MN 31-0 which stores the conversion table 343 of the root node is multiplexed and the multiplexed root pointers are stored in different MNs 31-3. Therefore, the storage system 4 can search for the data address using a plurality of conversion tables 343 having a link relationship with a tree structure in which the number of layers is changed, such as the B-tree, therebetween. In addition, the root pointer is multiplexed and the multiplexed root pointers are stored in different MNs 31-3. Therefore, it is possible to disperse access to the MN 31-3 storing the root pointer. As a result, it is possible to prevent deterioration of the performance due to the concentration of access to the MN 31-3.

When the number of entries in the Root K2K reaches a predetermined value, the MN 31-3 divides the Root K2K into a plurality of 2nd K2Ks, generates a new Root K2K, and stores the divided 2nd K2Ks and the newly generated Root K2K in different MNs 31. Therefore, the storage system 4 can change the number of layers in the tree structure formed by a plurality of conversion tables 343.

The storage system 4 according to the second embodiment or the third embodiment may be configured such that the entries can be exchanged between the conversion tables 343 in the same layer. For example, the MN 21 which stores an i-th-layer conversion table 343 transmits the entry to the MN 21 which stores the conversion table 343 of the parent node. When receiving the entry, the MN 21 selects one of a plurality of MNs 21 that store the conversion table 343, which is a child node of the conversion table 343 stored therein, transmits the registration update command to the selected MN 21, and adds the entry thereto. In addition, the MN 21 which stores the i-th-layer conversion table 343 may monitor a plurality of conversion tables 343 of the child nodes, delete the entry from the conversion table 343 of one child node, and add the deleted entry to the conversion tables 343 of the other child nodes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
    a plurality of memory nodes configured to be connected to each other in two or more different directions, including a first memory node and a second memory node grouped as a logical memory node; and
    a connection unit configured to issue a first command including a first address and a second address in response to a request from outside, the first address designating the logical memory node, the second address designating the first memory node within the logical memory node, and
    the first memory node storing first data to be accessed by the first command, the second memory node storing second data which is redundant data of the first data,
    wherein the first memory node, in response to the first command, accesses the first data in the first memory node, and issues a second command for accessing the second data, the second command including the first address designating the logical memory node including the grouped first and second memory nodes and a third address designating the second memory node within the logical memory node, so as to autonomously identify the second memory node storing the redundant data of the first data.

2. The storage system according to claim 1, wherein,
    the first command is a command to write the first data,
    the second command is a command to update the second data, and
    the first memory node, in response to the first command, executes write operation to write the first data, and issues the second command to the second memory node.

3. The storage system according to claim 1, wherein,
    the first command is a command to read the first data,
    the second command is a command to acquire the second data, and
    the first memory node,
        in response to the first command, executes read operation to read the first data,
        in a case where the first memory node fails in the read operation, issues the second command to the second memory node, and
        in response to acquiring the second data from the second memory node, restores the first data using the second data.

4. The storage system according to claim 1, wherein,
    the first command is a command to read the first data,
    the second command is a command to restore the first data,
    the first memory node,
        in response to the first command, executes read operation to read the first data,
        in a case where the first memory node fails in the reading operation, issues the second command to the second memory node, and
    the second memory node, in response to the second command, restores the first data using the second data in the second memory node.

5. The storage system according to claim 4, wherein the second memory node transmits the restored first data to the connection unit.

6. The storage system according to claim 1 further comprising a first blade board and a second blade board, wherein the first memory node is mounted on the first blade board, and the second memory node is mounted on the second blade board.

* * * * *